US011726954B1

(12) United States Patent
Rungta et al.

(10) Patent No.: US 11,726,954 B1
(45) Date of Patent: Aug. 15, 2023

(54) MULTI-ACTION BACKGROUND PROCESS FOR A RESOURCE-CONSTRAINED SYSTEM

(71) Applicant: Amazon Technologies, Inc., Seattle, WA (US)

(72) Inventors: Vandana Rungta, San Jose, CA (US); Michael F Brown, Cambridge, MA (US); Ernest S Cohen, Wyncote, PA (US); Srinivasa Rao Vempati, Upton, MA (US); Arkady Michael Degtiarov, Newton, MA (US); Benjamin Scott Dow, Boston, MA (US)

(*) Notice: Subject to any disclaimer, the term of this patent is extended or adjusted under 35 U.S.C. 154(b) by 272 days.

(21) Appl. No.: 17/037,330

(22) Filed: Sep. 29, 2020

(51) Int. Cl.
*G06F 16/10* (2019.01)
*G06F 16/11* (2019.01)
*G06F 11/14* (2006.01)
*G06F 16/18* (2019.01)
*G06F 16/176* (2019.01)

(52) U.S. Cl.
CPC ........ *G06F 16/125* (2019.01); *G06F 11/1451* (2013.01); *G06F 11/1469* (2013.01); *G06F 16/1774* (2019.01); *G06F 16/1865* (2019.01)

(58) Field of Classification Search
None
See application file for complete search history.

(56) References Cited

U.S. PATENT DOCUMENTS

| 7,346,831 B1* | 3/2008 | Corbett | G06F 11/1076 714/766 |
| 7,647,526 B1* | 1/2010 | Taylor | G06F 11/1662 714/6.32 |
| 2020/0387433 A1 | 12/2020 | Wang et al. | |
| 2021/0240574 A1* | 8/2021 | Upadhyay | G06F 11/1464 |

OTHER PUBLICATIONS

Backblaze, The Best Unlimited Online Backup and Cloud Storage Services, https://www.backblaze.com.
(Continued)

*Primary Examiner* — Belix M Ortiz Ditren
(74) *Attorney, Agent, or Firm* — Knobbe Martens Olson & Bear LLP

(57) ABSTRACT

Aspects related to a resource-constrained system are described herein that can provide object storage services after a service interruption is resolved, even if all of the transactions that were pending and incomplete prior to the service interruption have not yet been recovered and/or executed. For example, file systems implemented by computing systems of the resource-constrained system may treat each file or directory as a separate object. Thus, a transaction directed to one file may not affect the file's directory or other files in the directory. As a result, the resource-constrained system can achieve read-after-write consistency without first recovering and executing the pending, incomplete transactions. Instead, read-after-write consistency for an object can be achieved simply by completing any pending, incomplete transaction directed to that object. Accordingly, the resource-constrained system can provide object storage services to user devices immediately after the service interruption is resolved, thereby resulting in fast crash recovery times.

20 Claims, 10 Drawing Sheets

(56) References Cited

OTHER PUBLICATIONS

Beach, Brian, Backblaze Open Sources Reed-Soloman Erasure Coding Source Code, https:www.backblaze.com/blog/reed-solomon/, Jul. 16, 2015.
Burrows, Mike, The Chubby lock service for loosely-coupled distributed systems, Google Inc., OSDI '06: 7th USENIX Symposium on Operating Systems Design and Implementation, Nov. 2006.
Ceph—a scalable distributed storage system, https://github.com/ceph/ceph, retrieved on Sep. 29, 2020.
Dysnc, https://github.com/minio/dsync, retrieved on Sep. 29, 2020.
Etcd, What is etcd?, https://etcd.io/, retrieved on Sep. 29, 2020.
Ext4(5)—Linux manual page, https://man7.org/linux/man-pages/man5/ext4.5.html, retrieved on Sep. 29, 2020.
Fsync(2)—Linux manual page, https://man7.org/linux/man-pages/man2/fsync.2.html, retrieved on Sep. 29, 2020.
Go-grpc-prometheus, https://github.com/grpc-ecosystem/go-grpc-prometheus, retrieved on Sep. 29, 2020.
Grant, et al., Inferring and Asserting Distributed System Invariants, ICSE '18, May 2018.
HighwayHash, https://github.com/minio/highwayhash, retrieved Sep. 29, 2020.
JavaReedSolomon, https://github.com/backblaze/javareedsolomon, retrieved Sep. 29, 2020.
Kubernetes, Operating etcd clusters for Kubernetes, https://kubernetes.io/docs/tasks/adminster-cluster/configure-update-etcd/, May 30, 2020.
Metrics.md, https://github.com/etcd-io/etcd/blob/master/documentation/metrics.md, retrieved on Sep. 29, 2020.
MinIO Quickstart Guide, https://github.com/minio/minio, retrieved on Sep. 29, 2020.
MinIO, How to monitor MinIO server with Prometheus, https://docs.min.io/docs/how-to-monitor-minio-using-prometheus.html, retrieved on Sep. 29, 2020.
Ongaro, et al., In Search of an Understandable Consensus Algorithm (Extended Version), Stanford University, May 20, 2014.
OpenIO, https://github.com/open-io/ retrieved on Sep. 29, 2020.
OpenStack Swift, https://github.com/openstack/swift, retrieved on Sep. 29, 2020.
Package concurrency, https://godoc.org/github.com/coreos/etcd/clientv3/concurrency, retrieved Sep. 29, 2020.
performance.md, https://github.com/etcd/blob/master/op-guide/performance.md, retrieved on Sep. 29, 2020.
Prometheus, Overview, https://prometheus.io/docs/introduction/overview/, retrieved on Sep. 29, 2020.
Redhat, Inc., 25.8 Persistent Naming, available at https://access.redhat.com/documentation/en-us/red_hat_enterprise_linux/7/html/storage_administration_guide/persistent_naming, retrieved Sep. 29, 2020.
Reed-Solomon, https://github.com/klauspost/reedsolomon, retrieved Sep. 29, 2020.
Riak Cloud Storage, https://docs.riak.com/riak/cs/2.1.1/index.html, retrieved on Sep. 29, 2020.
Walrus, https://github.com/eucalyptus/wiki/walrus/ retrieved on Sep. 29, 2020.

\* cited by examiner

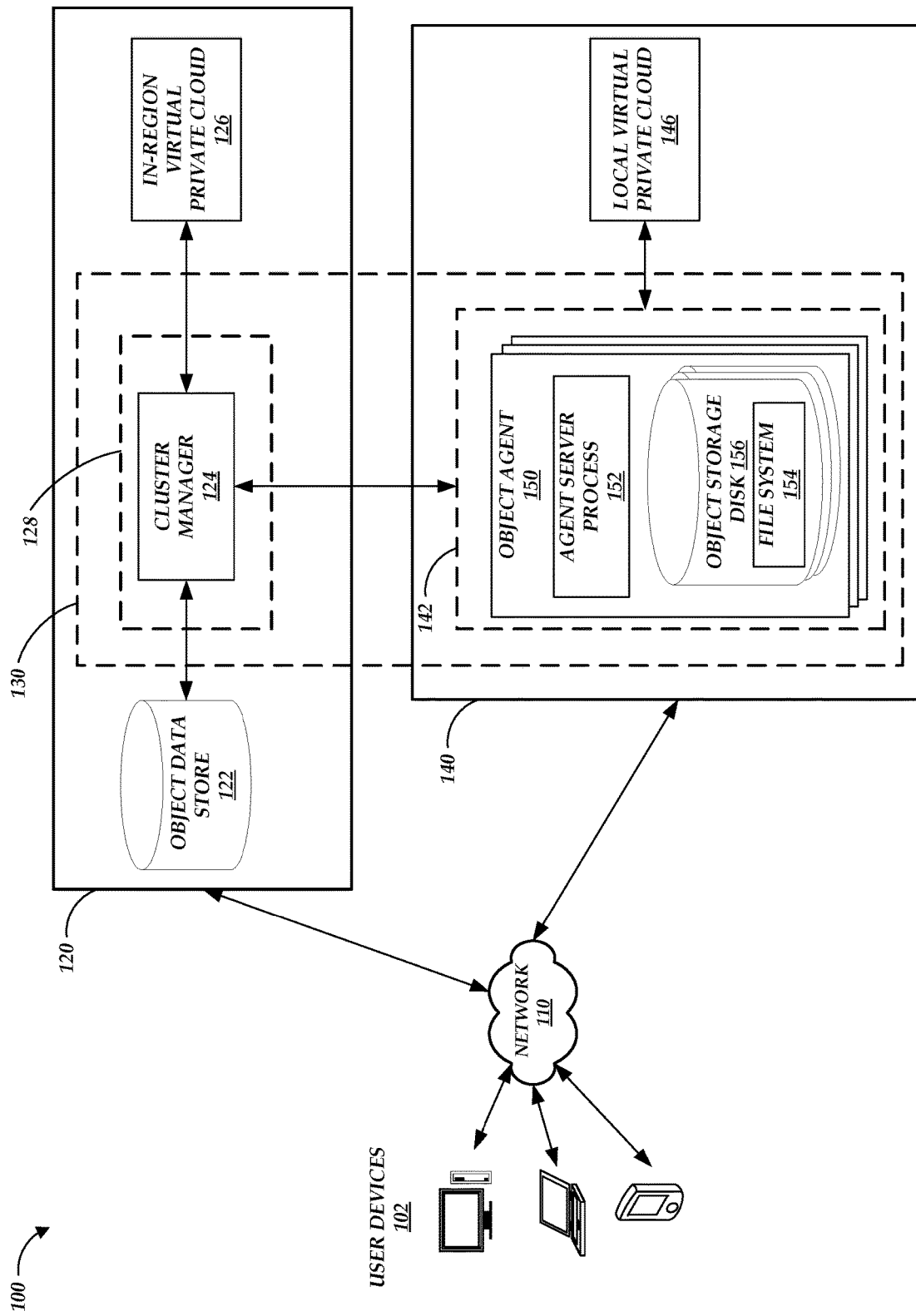

MULTI-ACTION BACKGROUND PROCESS FOR A RESOURCE-CONSTRAINED SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

Data centers can provide a number of beneficial services to user devices. For example, data centers may provide data storage services configured to store data submitted by user devices and to enable retrieval of that data over a network. A variety of types of data storage services can be provided, often varying according to their input/output (I/O) mechanisms. As one example, object storage services may allow I/O at the level of individual data objects or resources, such as individual files, which may vary in content and length.

BRIEF DESCRIPTION OF THE DRAWINGS

FIG. 1 is a block diagram of an illustrative operating environment in which a resource-constrained system communicates with an in-region or remotely-located data center and provides object storage services to user devices.

DETAILED DESCRIPTION

Figure 2A:
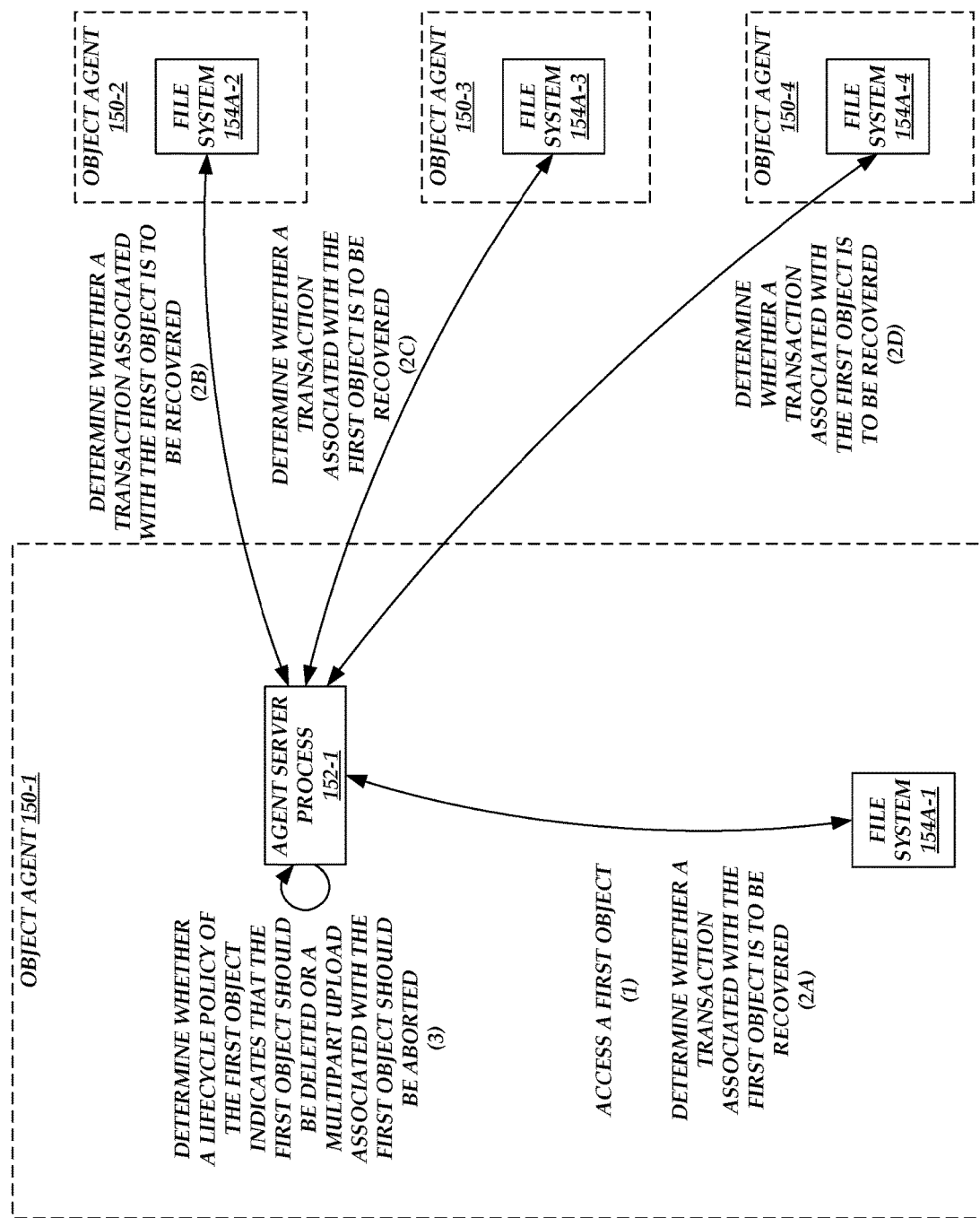
FIGS. 2A-2C are block diagrams of the operating environment of FIG. 1 illustrating the operations performed by the components of the operating environment to scan an object and perform one or more object storage service actions on the scanned object, according to one embodiment.

As described above, a data center may include a number of interconnected computing systems to provide computing resources (e.g., processing power, memory capacity, network bandwidth, etc.) to an organization or other users of the data center. In particular, a data center can provide a number of beneficial services to user devices of the organization, such as object storage services. Generally, the data center may be located remote from the place of business of the organization, such as in an area that has more space available for physical hardware components. As a result, the data center can offer seemingly unlimited computing resources.

In providing object storage services, the computing systems of a data center may scan objects (e.g., data objects) stored therein multiple times to perform actions on the objects. For example, the computing systems may scan objects and perform an action on the objects. If other, unrelated actions are to be performed, the computing systems may scan the objects again and perform one of the unrelated actions on the objects. The computing systems may repeat this process until the actions are all performed. Scanning and iterating over a large number of objects can be expensive in terms of the amount of computing resources that are allocated to perform the scans. Given the large amount of computing resources available to a remotely-located data center, however, performing multiple scans may not negatively affect the ability of the data center to retrieve, store, and/or process objects.

In some cases, the organization may prefer to operate a number of interconnected computing systems locally, such as at the place of business of the organization (e.g., "on-premise"), or in another resource-constrained environment (e.g., at a location in which computing resources are limited). The resource-constrained system may be in communication with the remotely-located data center, but the resource-constrained system may provide the same or similar services as the remotely-located data center. Because the computing resources of the resource-constrained system may be limited, however, implementing a typical object storage service that scans and iterates through all of the objects stored therein multiple times may be prohibitively expensive in terms of the amount of computing resources that are allocated to perform the scans. In other words, the resource-constrained system may not have the computing resources available to scan and iterate through each object stored therein multiple times to perform actions on the objects.

Accordingly, described herein is a resource-constrained set of interconnected computing systems that can use the same background process to scan and perform multiple, unrelated actions on objects. In other words, the resource-constrained set of interconnected computing systems described herein can scan or access an object and perform one or more unrelated actions on the object before iterating to the next object. As a result, the resource-constrained set of interconnected computing systems can offer the same types of object storage services as the remotely-located data center, while reducing the number of I/O operations that are executed when implementing the services. The resource-constrained set of interconnected computing systems may also be referred to herein as a resource-constrained system.

One of the services offered by a remotely-located data center that can also be offered by the resource-constrained system is a transaction system that ensures that the object storage services function properly. For example, a user device may instruct the computing systems of a data center or resource-constrained system to execute a transaction (e.g., a "get" operation, a "put" operation, a "copy" operation, a "delete" operation, an "initiate multipart upload" operation, an "upload part" operation, a "complete multipart upload" operation, etc.) on an object. Execution of the transaction may not be completed, however, if a hardware failure or other service interruption occurs (e.g., some or all of the computing systems crash, some or all of the computing systems lose power, some or all of the computing systems are down for maintenance, etc.). Once the service interruption is resolved, the computing systems may use the transaction system to recover and execute any transactions that may not have been completed due to the service interruption.

Typically, services offered by a remotely-located data center may be unavailable to user devices right after the service interruption is resolved. Rather, a remotely-located data center may use the transaction system to first recover and execute any pending, incomplete transactions before the offered services are made available to user devices. For example, typical remotely-located data centers aim to provide read-after-write consistency, such that any changes to an object can be read after those changes are written. Generally, a file is not separate from a directory on typical data center file systems that run transaction systems. Thus, any changes to a file may involve associated operations with the directory within which the object resides, with the parent directory, and so on. As a result, all of the pending, incomplete transactions for all of the objects stored in the remotely-located data center may need to be recovered and executed before read-after-write consistency can be achieved.

On the other hand, the resource-constrained system described herein can provide object storage services right after the service interruption is resolved (e.g., can allow user devices to access the object storage service right after the service interruption is resolved), even if all of the transactions that were pending and incomplete prior to the service interruption have not yet been recovered and/or executed. For example, the file systems implemented by the computing systems of the resource-constrained system may treat each file, directory, and/or the like as a separate, independent object. Thus, a transaction directed to one file may not affect the file's directory, other files in the directory, a parent directory, and/or the like. As a result, the resource-constrained system can achieve read-after-write consistency without first recovering and executing the pending, incomplete transactions. Instead, read-after-write consistency for an object can be achieved simply by completing any pending, incomplete transaction directed to that specific object. Accordingly, the resource-constrained system described herein can provide object storage services to user devices immediately after the service interruption is resolved, thereby resulting in fast crash recovery times. The resource-constrained system can also use an improved transaction system to recover and execute any pending, incomplete transactions in the background and/or when a transaction for a specific object is received. Additional details of the improved transaction system are described below.

The foregoing aspects and many of the attendant advantages of this disclosure will become more readily appreciated as the same become better understood by reference to the following description, when taken in conjunction with the accompanying drawings.

Example Object Storage Service Operating Environment

FIG. 1 is a block diagram of an illustrative operating environment 100 in which a resource-constrained system 140 communicates with an in-region or remotely-located data center 120 and provides object storage services to user devices 102. As illustrated in FIG. 1, one or more user devices 102 may communicate with the resource-constrained system 140 via a network 110 and/or communicate with the in-region data center 120 via the network 110. The resource-constrained system 140 and the in-region data center 120 may also communicate with each other via a local area network established between subnet 128 of the in-region data center 120 and subnet 142 of the resource-constrained system 140. For example, the subnet 128 and the subnet 142 may be located within a shared virtual private cloud 130 that is associated with an entity that manages the resource-constrained system 140 and that allows communications between the subnets 128 and 142.

The term "virtual private cloud network environment" (sometimes shortened to "virtual private cloud" or simply "VPC") generally refers to a virtualized network environment, in which a collection of computing devices is enabled, for example, by a substrate network, to communicate, including for example as if the collection of computing devices existed within a local area network (LAN) environment. Accordingly, the devices within a VPC may often share a common subnet, and (from the perspective of the devices) directly communicate with one another without the use of complex routing protocols. However, unlike traditional LANs, the devices within a VPC need not share a direct physical interconnection. Instead, the devices may be located in geographically diverse regions, and in some instances may themselves be virtual devices (e.g., virtual machines). A substrate (e.g., physical) network may encapsulate or otherwise alter communications from devices associated with the VPC to create the illusion, from the point of view of devices within the VPC, that a LAN environment exists. VPCs provide many advantages over traditional LANs, in that the configuration of computing devices can be changed dynamically, via software, without changing a physical configuration of devices. Moreover, VPCs maintain many benefits of traditional LANs in that communications between the computing devices are relatively simple and secure. A single data center may include sufficient hardware to implement multiple VPCs, each of which may be isolated from each other (e.g., each VPC may include a separate substrate network). Additional details of the components included in VPCs and the techniques used to implement VPCs are described in U.S. patent application Ser. No. 15/245,089, entitled "EXTERNAL HEALTH CHECKING OF VIRTUAL PRIVATE CLOUD NETWORK ENVIRONMENTS" and filed on Aug. 23, 2016, which is hereby incorporated herein by reference in its entirety.

By way of illustration, various example user devices 102 are shown in communication with the in-region data center 120 and the resource-constrained system 140, including a desktop computer, laptop, and a mobile phone. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks.

For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The in-region data center 120 may be located in a single geographic location or located in multiple, distinct geographic locations (e.g., interconnected via private or public communication networks). The in-region data center 120 may comprise one or more interconnected physical computing devices that implement various components, such as an object data store 122, a cluster manager 124, and an in-region VPC 126.

The object data store 122 may be configured to store one or more objects, such as files, directories, etc. User devices 102 can submit various transactions to the in-region data center 120 to upload, read, modify, and/or delete objects stored in the object data store 122.

The cluster manager 124 may be associated with an entity that manages the resource-constrained system 140 and can be located within the subnet 128. The cluster manager 124 can provide an interface between the object data store 122 and the in-region virtual private cloud 126 of the in-region data center 120 and the components within the subnet 142 of the resource-constrained system 140. For example, the cluster manager 124 can facilitate the synchronization of data between the object data store 122 and the resource-constrained system 140. The cluster manager 124 can also facilitate communications between the in-region VPC 126 and a local VPC 146 located in the resource-constrained system 140.

The in-region VPC 126 can be a virtualized network environment associated with a specific entity that can provide computing resources, run applications, execute object storage operations, and/or the like. While FIG. 1 depicts a single in-region VPC 126 being present in the in-region data center 120, this is not meant to be limiting. The in-region data center 120 can include any number of in-region VPCs that are associated with the same entity and/or any number of in-region VPCs associated with different entities.

Like the in-region data center 120, the resource-constrained system 140 may be located in a single geographic location or located in multiple, distinct geographic locations (e.g., interconnected via private or public communication networks). Generally, the resource-constrained system 140 may be located at or near an associated entity's place of business (e.g., "on-premise") or at location(s) otherwise associated with an entity. The resource-constrained system 140 may comprise one or more interconnected physical computing devices that include at least one hardware processor and that implement various components, such as one or more object agents 150 and the local VPC 146.

An object agent 150 can be implemented by one or more physical computing devices and/or one or more virtual computing devices running on one or more physical computing devices. The subnet 142 can include any number of object agents 150 associated with a particular entity. As an illustrative example, the subnet 142 may include 4 object agents 150 associated with a particular entity. Collectively, the object agents 150 associated with a particular entity can be configured to perform various object storage service actions in relation to objects associated with the entity.

For example, an object agent 150 can include an agent server process 152 and one or more object storage disks 156.

An object storage disk 156 may be a physical disk or a virtual disk. The object storage disk 156 may also be referred to herein as an "object data store." Each object agent 150 associated with a particular entity may have the same number of object storage disks 156 in some embodiments. For ease of explanation, the present disclosure describes the subnet 142 as including 4 object agents 150-1 through 150-4, with each object agent 150-1 through 150-4 including 4 object storage disks 156. This is not meant to be limiting, however, given that the subnet 142 can include any number of object agents 150 and each object agent 150 can include any number of object storage disks 156.

Each object storage disk 156 may include a unique file system 154, and the file system(s) 154 of one object agent 150-1 may have the same named mountpoint(s) as the file system(s) 154 of the other object agents 150-2 through 150-4. As an illustrative example, if each object agent 150-1 through 150-4 includes 4 object storage disks 156, then the file systems 154-1 of object agent 150-1 may have mountpoints with names "mountpoint_0," "mountpoint_1," "mountpoint_2," and "mountpoint_3;" the file systems 154-2 of object agent 150-2 may have mountpoints with names "mountpoint_0," "mountpoint_1," "mountpoint_2," and "mountpoint_3;" the file systems 154-3 of object agent 150-3 may have mountpoints with names "mountpoint_0," "mountpoint_1," "mountpoint_2," and "mountpoint_3;" and the file systems 154-4 of object agent 150-4 may have mountpoints with names "mountpoint_0," "mountpoint_1," "mountpoint_2," and "mountpoint_3." The object storage disks 156 in the subnet 142 that have the same file system 154 mountpoint name may be grouped into an erasure coded set. Thus, 4 erasure coded sets may be formed in the example above, with the object storage disks 156A-1 through 156A-4 associated with "mountpoint_0" forming a first erasure coded set, the object storage disks 156B-1 through 156B-4 associated with "mountpoint_1" forming a second erasure coded set, the object storage disks 156C-1 through 156C-4 associated with "mountpoint_2" forming a third erasure coded set, and the object storage disks 156D-1 through 156D-4 associated with "mountpoint_3" forming a fourth erasure coded set.

Collectively, the object storage disks 156 in the subnet 142 may store objects (e.g., files, directories, etc.) associated with the entity that operates the resource-constrained system 140. An object associated with an entity that is to be stored in the resource-constrained system 140 may be assigned to one of the erasure coded sets. For example, one or more of the agent server processes 152 can take a hash of the key or name of the object, with the resulting hash value indicating which erasure coded set will be assigned to store the object (e.g., an agent server process 152 can take a hash of the key of the object and take the resulting hash value modulus 4 to determine the erasure coded set to be assigned to store the object). Once the erasure coded set is assigned, content of the object can be sharded across the object storage disks 156 corresponding to assigned erasure coded set. For example, if an agent server process 152 determines that an object should be assigned to the first erasure coded set, then the agent server process 152 may store at least a portion of the object in each file system 154A-1 through 154A-4. In an embodiment, an agent server process 152 can store parity blocks corresponding to the object in half of the file systems 154A-1 through 154A-4 and can store data blocks corresponding to the object in the other half of the file systems 154A-1 through 154A-4. The agent server process 152 can use the hash of the name of the object to determine whether a file system 154A-1 through 154A-4 stores a parity block or a data block (e.g., the hash of the name of the object may indicate an order of file systems 154A-1 through 154A-4, with the first ordered file system 154A receiving a data block, the second ordered file system 154A receiving a data block, the third ordered file system 154A receiving a parity block, and the fourth ordered file system 154A receiving a parity block). As an illustrative example, if the hash of the name of the object indicates that the order of file systems 154A is 154A-4, 154A-1, 154A-3, and 154A-2, then the agent server process 152 can store half of the object (e.g., or a portion of the object that is equal to 2 divided by the number of object storage disks 156 in the erasure coded set) as a data block in the file system 154A-4, can store the other half of the object (e.g., or another portion of the object that is equal to 2 divided by the number of object storage disks 156 in the erasure coded set) as a data block in the file system 154A-1, can store half of the object (e.g., or a portion of the object that is equal to 2 divided by the number of object storage disks 156 in the erasure coded set) as a parity block in the file system 154A-3, and can store the other half of the object (e.g., or another portion of the object that is equal to 2 divided by the number of object storage disks 156 in the erasure coded set) as a parity block in the file system 154A-2.

Example Object Storage Service Actions

Some or all of the agent server processes 152 in the subnet 142 can be configured to perform various object storage service actions in relation to the objects that are stored in the resource-constrained system 140. The agent server process(es) 152 can perform the object storage service actions in the background (e.g., when the resource-constrained system 140 is idle, when sufficient processing capacity of the resource-constrained system 140 is available to perform one or more of the actions, while the resource-constrained system 140 is performing other operations, not in response to any request or instruction submitted by a user device 102, etc.) and/or in response to receiving a transaction submitted by a user device 102.

The object storage service actions can include implementing a transaction system to execute transactions and/or to recover and execute any pending, incomplete transactions, implementing lifecycle policies on objects, reconstructing object blocks if any data blocks or parity blocks are missing from the file systems 154, and performing bitrot checks to ensure the validity of the data blocks and/or parity blocks. These object storage service actions are unrelated, and therefore typical remotely-located data centers may perform separate object scans if such remotely-located data centers were capable of performing the object storage service actions described herein. Some or all of the agent server processes 152, however, can perform some or all of these object storage service actions during a single scan of the stored objects. Thus, the agent server process(es) 152 can reduce the number of I/O operations to read and/or write objects from O(N*the number of unrelated actions to be performed) to O(N). In fact, because the agent server process(es) 152 can perform one or more of the unrelated actions during the same scan, results of one action may indicate that a second action does not need to be performed. As an illustrative example, in implementing lifecycle policies on objects, the agent server process(es) 152 may determine that a lifecycle policy indicates that an object should be deleted. As a result, the agent server process(es) 152 may skip an object reconstruction operation or performing a bitrot check. Thus, the agent server process(es) 152 can further reduce the number of I/O operations that are executed in performing the unrelated object storage service actions. The object storage service actions are described in greater detail below.

Prior to performing the object storage service actions, the agent server processes 152 of the object agents 150 in the subnet 142 may communicate with each other and select a leader agent server process 152. The leader agent server process 152, which may be one of the agent server processes 152 in the subnet 142, may perform the object storage service actions. Alternatively or in addition, two or more agent server processes 152 can be co-leaders and jointly perform the object storage service actions (e.g., the agent server processes 152 may each perform a separate action, the agent server processes 152 may each scan and perform actions on a certain subset of the stored objects, etc.). For ease of illustration and not meant to be limiting, the present disclosure describes the object storage service actions as being performed by a single leader agent server process 152.

The leader agent server process 152 can scan the objects stored in the subnet 142 and, for each object, perform one or more of the object storage service actions on the respective object. For example, the leader agent server process 152 can scan a first object. Scanning the first object may include reading or accessing the data blocks of the object from the appropriate file systems 154 and/or reading or accessing one or more of the parity blocks of the object from the appropriate file systems 154 if one or more of the data blocks are unavailable. Once scanned, the leader agent server process 152 can determine whether any pending, incomplete transactions associated with the first object need to be recovered. If so, the leader agent server process 152 can recover and execute the pending, incomplete transaction(s), which is described in greater detail below.

After determining whether any pending, incomplete transactions associated with the first object need to be recovered (and/or recovering and executing such transactions), the leader agent server process 152 can implement a lifecycle policy associated with the first object. For example, a lifecycle policy may indicate a time at which an object should be expired or deleted (e.g., where the time may be relative to the time at which the object was created, last accessed, last modified, and/or the like). A lifecycle policy may also indicate a time by which an incomplete multipart upload should be aborted (e.g., where the time may be relative to the time at which a multipart upload was initiated, the time at which the first part was uploaded, the time at which the last part was uploaded, a user-defined time, and/or the like). If the lifecycle policy indicates that the first object should be expired or deleted and/or that the first object is associated with a multipart upload that should be aborted, then the leader agent server process 152 can delete the first object and/or abort the corresponding multipart upload (e.g., delete individual uploaded parts that, if the upload had been completed, would have formed the first object). If the first object is deleted and/or the multipart upload is aborted, then the leader agent server process 152 may skip the remaining object storage service actions given that the first object has been deleted.

Otherwise, if the lifecycle policy does not indicate that the first object should be deleted or that a corresponding multipart upload should be aborted, then the leader agent server process 152 can determine whether the first object should be reconstructed or healed. The first object may be reconstructed or healed if a parity block or a data block is missing from one of the file systems 154. For example, a parity block or data block may be missing if the object storage disk 156 upon which a file system 154 is created crashed, experienced a hardware failure, was subject to a power outage and therefore is unavailable, is down for maintenance, and/or the like. If at least one block is missing and at least a read quorum of blocks of the first object are available from other file systems 154 in the erasure coded set assigned to the first object (e.g., if at least 50% of the blocks, either parity or data, are available on the other file systems 154 in the erasure coded set), then the leader agent server process 152 can reconstruct the missing parity and/or data blocks using the available parity and/or data blocks and can store the reconstructed block(s) on the file system(s) 154 in the erasure coded set that are missing the appropriate block(s). By reconstructing the missing block(s), the leader agent server process 152 can ensure that the resource-constrained system 140 is fully resilient to a future service interruption.

Finally, once the leader agent server process 152 has determined whether the first object should be reconstructed or healed (and performed the reconstruction or healing if necessary), the leader agent server process 152 can perform a bitrot (e.g., a disk sector error) check. For example, over time bits can become lost, invalid, or return the wrong value due to disk degradation issues. Thus, the data blocks and the parity blocks of the first object may appear to be present in the appropriate file systems 154, but the values returned by the underlying object storage disks 156 may be invalid or return an error. In some embodiments, the resource-constrained system 140 (e.g., an object agent 150) can splice one or more checksums into one or more portions of the data blocks and/or the parity blocks of an object. Accordingly, the leader agent server process 152 can, for each checksum in each data block and/or parity block of the first object, access the respective checksum in the respective block, compute a checksum based on the portion of the respective block corresponding to the respective checksum, and compare the accessed respective checksum with the computed checksum. If the checksums differ, this may indicate that bitrot has occurred. The leader agent server process 152 can then attempt to reconstruct or heal the respective block using at least a read quorum of the other blocks of the first object in a manner as described above.

Because parity blocks are generally accessed only if at least one data block is unavailable, some parity blocks may not be accessed for months or years. Thus, in typical systems, bitrot that affects data blocks may be recognized soon after the bitrot occurs, but bitrot that affects parity blocks may take years to identify. In either situation, typical systems may attempt to resolve the bitrot issue when the parity or data block is accessed in response to a user device 102 request, thereby increasing data retrieval and/or processing latency. However, because the leader agent server process 152 performs the bitrot check during the object scan and while performing the other, unrelated actions, the leader agent server process 152 may recognize bitrot early and well before a parity or data block is accessed in response to a user device 102 request. Thus, the leader agent server process 152 can fix any bitrot issues before the data is requested, thereby reducing data retrieval and/or processing latency.

Once the leader agent server process 152 has performed the bitrot check (and resolved any bitrot issues if present), then the leader agent server process 152 can scan the next object and repeat some or all of the object storage service actions described above. The leader agent server process 152 may repeat these operations until all objects stored in the subnet 142 have been scanned and some or all of the object storage service actions have been performed on the objects. Once all objects have been scanned and the action(s) are performed, the leader agent server process 152 may once again scan the first object and repeat the process. The new scan may occur immediately after the last object is scanned and the action(s) are performed on the last object and/or some threshold time after the last object is scanned and the action(s) are performed on the last object.

While the object storage service actions performed by the leader agent server process 152 are described in a certain order, this is not meant to be limiting. Rather, the leader agent server process 152 can perform the object storage service actions in any order. For example, the leader agent server process 152 can implement the lifecycle policy first instead. If the lifecycle policy indicates that an object should be deleted or a corresponding multipart upload should be aborted, then the leader agent server process 152 may skip the remaining object storage service actions and begin scanning the next object.

The object storage service actions described herein may be considered unrelated to each other given that the result or output of one action is not used as an input to another action. Rather, the object storage service actions described herein may be considered unrelated to each other because each action can be performed independent of the other actions. The actions can also be performed in any order given that the actions are unrelated.

Implementation of a Transaction System

In addition to performing the object storage service actions described above, the leader agent server process 152 can implement a transaction system to process transactions submitted by user devices 102. For example, a user device can submit to the resource-constrained system 140 a transaction associated with an object. The transaction can be a "get" operation (e.g., an operation to read and transmit to a user device 102 or the in-region data center 120 an identified object), a "put" operation (e.g., an operation to store an object provided by a user device 102 or the in-region data center 120), a "copy" operation (e.g., an operation to copy an identified object into another directory or storage bucket), a "delete" operation (e.g., an operation to delete an identified object), an "initiate multipart upload" operation (e.g., an operation to create a staging directory for storing parts of an object to be uploaded in a multipart manner), an "upload part" operation (e.g., an operation to store in a staging directory an uploaded part of an object), a "complete multipart upload" operation (e.g., an operation to combine and move the uploaded parts of the object into a directory or storage bucket associated with the object), and/or the like. The transaction submitted by a user device 102 may be considered a distributed transaction because in addition to processing or executing the transaction, the leader agent server process 152 may also instruct other agent server processes 152 to perform the same transaction processing or execution operations, as explained below.

Upon receiving a transaction, the leader agent server process 152 can perform a series of operations in phases. For example, the leader agent server process 152 may initially perform a setup phase. During the setup phase, the leader agent server process 152 can acquire a global lock on the object identified in the transaction to ensure that another agent server process 152 does not have access to the object while the transaction is being executed. In an embodiment, the agent server processes 152 in the subnet 142 may select an agent server process 152 to be responsible for all state changes that occur in the subnet 142. The agent server process 152 selected to be responsible for all state changes that occur in the subnet 142 may or may not be the same agent server process 152 as the leader agent server process 152. If the leader agent server process 152 is not the agent server process 152 selected to be responsible for all state changes (referred to herein as the agent server process 152 state change leader), then the leader agent server process 152 can request a global lock from the agent server process 152 state change leader. Similarly, other agent server processes 152 can request a local lock from the agent server process 152 state change leader (e.g., during the complete phase). The agent server process 152 state change leader may grant a global lock request if no other agent server process 152 has requested and been granted a currently active local or global lock on the object. Similarly, the agent server process 152 state change leader may grant a local lock request if a local lock request has not already been granted and is currently active on the object. If granted, the agent server process 152 state change leader may inform the other agent server processes 152 that the lock on the object has been granted. If the leader agent server process 152 is also the agent server process 152 state change leader, then the leader agent server process 152 may determine whether a global or local lock has been previously granted and is still active on the object and, if not, inform the other agent server processes 152 that a global lock on the object has now been granted to the leader agent server process 152. As part of granting a global lock on the object, the agent server process 152 state change leader may provide an object revision identifier, which may be a monotonically increasing identifier. In other words, each time a global lock is requested on a particular object, a revision identifier for the object is incremented and provided to the lock requester.

Alternatively, none of the agent server processes 152 may be responsible for all state changes that occur in the subnet 142. Rather, a separate process present in the subnet 142 (not shown) may act as a state change leader. The separate process can be internal to one of the object agents 150 or external to the object agents 150, and can grant or deny global lock requests submitted by the object agents 150. Each agent server process 152 may still manage local locks internally. The leader agent server process 152 can therefore request a global lock from this separate process, and the separate process can grant the global lock request if the conditions described above are satisfied. If granted, the separate process may inform the other agent server processes 152 that the lock on the object has been granted and/or the requesting agent server process 152 may inform the other agent server processes 152 that the lock on the object has been granted. As part of granting a global lock on the object, the separate process may provide an object revision identifier.

Once the lock request is granted, the leader agent server process 152 may determine whether a prior incomplete transaction (e.g., a pending, incomplete transaction) is present. For example, a prior incomplete transaction may be present if a service interruption prevented the execution of the prior transaction from being completed. As explained herein, the resource-constrained system 140 may be accessible by user devices 102 after the service interruption is resolved (e.g., after service to user devices 102 is restored), even if all prior incomplete transactions have yet to be recovered and/or executed given that the resource-constrained system 140 can achieve read-after-write consistency without having to first recover all pending, incomplete transactions. Thus, a prior incomplete transaction may be present even though a user device 102 may be interacting with and be able to access the resource-constrained system 140. As described below, a staging sub-directory may be created in each file system 154 by the leader agent server process 152 and other agent server processes 152 in the process of executing a transaction. The staging sub-directory may also be referred to herein as a "staging area," a "staging storage area," a "temporary sub-directory," a "temporary storage area," a "provisional sub-directory," a "provisional storage area," a "processing storage area," an "interim storage area," a "short-term storage area," and/or a "preparation storage area." In particular, the agent server processes 152 may each create a staging sub-directory in a staging directory that serves as a temporary storage location. The staging sub-directory may have a name that is a hash of the object. The staging sub-directory may be a temporary storage location that is a different storage location than the storage bucket or directory in which an object is actually stored. The staging sub-directory may include an artifact or other metadata that indicates the phase of a transaction and the staging sub-directory may be deleted once a transaction is fully executed. Thus, if any of the agent server processes 152 takes a hash of the object and identifies a staging sub-directory present in the staging directory that has a name matching the hash result, then this may indicate that a prior incomplete transaction is present for that object. The leader agent server process 152 can take a hash of the object and identify whether a staging sub-directory present in the file system 154 of the leader agent server process 152 has a name matching the hash result, and the other agent server processes 152 can do the same for their respective file systems 154. If one of the other agent server processes 152 identifies a staging sub-directory associated with the object, the agent server process 152 may inform the leader agent server process 152.

If a prior incomplete transaction is detected, then the leader agent server process 152 may recover and execute the prior incomplete transaction (either from a local staging sub-directory or from a staging sub-directory present on another object agent 150) and/or cause another agent server process 152 to recover and execute the prior incomplete transaction before resuming execution of the current transaction. For example, the leader agent server process 152 can parse the artifacts present in the staging sub-directory to determine in which phase the prior transaction was in before execution was paused and continue with execution of the prior transaction from this phase. The process for recovering and executing the prior incomplete transaction is described in greater detail below.

If no prior transaction is present and/or the prior transaction is fully executed, then the leader agent server process 152 can continue with the propose phase. In the propose phase, the leader agent server process 152 can create the staging sub-directory in the file system 154 of the leader agent server process 152. For example, the leader agent server process 152 can take a hash of the object and use the resulting hash value as the name of the staging sub-directory. Once the staging sub-directory is created, the leader agent server process 152 may begin writing content to the staging sub-directory. The content may include data related to the transaction (e.g., the content of the object provided by the user device 102, in-region data center 120, or local VPC 146, which may be an entirely new object data or an updated version of object data currently stored in the resource-constrained system 140). The leader agent server process 152 can store the data related to the transaction in one folder in the staging sub-directory. In some embodiments, the name of the data related to the transaction can include an identification of the transaction and/or the object revision identifier.

During the propose phase, the leader agent server process 152 can instruct the other agent server processes 152 in the subnet 142 to create, in the same manner, the staging sub-directory in the staging directory of their respective file systems 154. The leader agent server process 152 can also provide the data related to the transaction and/or the current state of the object to the other agent server processes 152 such that the other agent server processes 152 can store this data in the appropriate folders in their respective staging sub-directories.

The leader agent server process 152 may then enter the commit phase. During the commit phase, the leader agent server process 152 can store metadata associated with the object identified in the transaction in the folder in the staging sub-directory that includes the data related to the transaction. The leader agent server process 152 can also instruct the other agent server processes 152 in the subnet 142 to store the metadata in the appropriate folders in their respective staging sub-directories. The metadata can include an identification of the storage bucket or directory in which the object is to be stored, a name of the object, file size of the object, a date that the object was created, permissions associated with the object, and/or the like.

The leader agent server process 152 may cause execution of the transaction to fail and cause deletion of the staging sub-directories if at least a write quorum of the object agents 150 do not write the data related to the transaction and/or the metadata to the appropriate staging sub-directories. A write quorum of object agents 150 may be a majority of object agents 150 in the subnet 142 (e.g., 3 object agents 150 in the example described above).

If at least a write quorum of object agents 150 has written the data related to the transaction and/or the metadata to the appropriate staging sub-directories, then the leader agent server process 152 can enter the complete phase. During the complete phase, each agent server process 152 make take a local lock on the object (e.g., where the local lock is only applicable to the object agent 150 in which the agent server process 152 resides) and verify that the global lock requested by the leader agent server process 152 is still valid. If the global lock has expired (e.g., the leader agent server process 152 no longer has a global lock on the object), then the agent server process 152 may release the local lock and execution of the transaction may fail. If the global lock has not expired, then each agent server process 152 can move the current state of the object, such as the version of the object currently stored in the storage bucket or directory, from the storage bucket or directory in the file system 154 to a folder in the staging sub-directory. For example, the agent server process 152 can store the current state of the object in a folder (e.g., an "old data" folder) in the staging sub-directory that is separate from the folder that stores the data related to the transaction. In some embodiments, the name of the current state of the object can include an identification of the transaction and/or the object revision identifier. The leader agent server process 152 can complete the transaction by moving the data related to the transaction from the staging sub-directory to the storage bucket or directory in the file system 154. The leader agent server process 152 can also instruct the other agent server processes 152 in the subnet 142 to move the data related to the transaction from the staging sub-directory to the storage bucket or directory in their respective file system 154. Each agent server process 152 may release the local lock after the moves are complete and/or if any of the moves fails.

Once the complete phase is finished, the leader agent server process 152 can enter the cleanup phase. In the cleanup phase, the leader agent server process 152 can delete the staging sub-directory associated with the object, which can include deleting the old version of the object. The leader agent server process 152 can also instruct the other agent server processes 152 in the subnet 142 to delete their respective staging sub-directories. Prior to deleting the staging sub-directory, each agent server process 152 may obtain a local lock of the object and verify the validity of the global lock, as described above with respect to the complete phase. If the global lock is no longer valid, then execution of the transaction may fail. Each agent server process 152 may release the local lock if the global lock is valid and after their respective staging sub-directories are deleted, and the leader agent server process 152 may then request a release of the global lock to finish the transaction execution process.

While the present disclosure describes various phases that may be performed by the leader agent server process 152 to execute a transaction, the order in which the phases are described and the specific operations described as being performed in each phase is not meant to be limiting. For example, the leader agent server process 152 can collapse one or more phases into a single phase, skip one or more phases, skip one or more operations of one or more phases, and/or perform the phases in a different order than the order described above. As an illustrative example, the propose phase may be skipped if a delete transaction is received given that there is no new data to write. In addition, the complete phase may not involve moving data related to a transaction from the staging sub-directory to the storage bucket or directory if a delete transaction is received. Rather, the current state of the object may be moved to the staging sub-directory, which may then be deleted during the cleanup phase.

As described herein, an agent server process 152 can recover a prior transaction while performing an object scan (e.g., an object scan that occurs in the background) and/or when a new transaction is received for an object that has a prior, incomplete transaction (e.g., during the setup phase of the new transaction). Generally, as part of the prior transaction recovery process, the agent server process 152 may heal or reconstruct the current state of the object (e.g., the version of the object stored in the storage bucket or directory) if the object revision identifier of the prior transaction is less than the object revision identifier associated with the current state of the object because this may indicate that other transactions submitted after the prior transaction have already been executed. For example, the agent server process 152 can use the data blocks and/or parity blocks of the current state of the object to heal or reconstruct the current state of the object to be stored on any object agent 150 that is missing the data block and/or parity block (e.g., with the assumption that at least a read quorum of the object agents 150 has a data block and/or parity block). The agent server process 152 may roll the object forward (e.g., update the current state of the object based on the data related to the prior transaction) if the object revision identifier of the prior transaction is not greater than the object revision identifier of the current state of the object and there is a read quorum on the object revision identifier of the prior transaction (e.g., at least 50% of the object agents 150 have the metadata of the object corresponding to the prior transaction stored in the staging sub-directory) because this may indicate that enough agent server processes 152 had completed the commit phase (e.g., enough agent server processes 152 had written metadata to the staging sub-directory) for the leader agent server process 152 to determine that the data related to the prior transaction is valid. The agent server process 152 may roll the object back (e.g., keep the current state of the object and delete data related to the transaction) if the object revision identifier of the prior transaction is not greater than the object revision identifier of the current state of the object, there is a write quorum of object agents 150 (e.g., a majority of the object agents 150 in the subnet 142 are active), and there is no read quorum on the object revision identifier of the prior transaction (e.g., less than 50% of the object agents 150 have the metadata of the object corresponding to the prior transaction stored in the staging sub-directory) because this may indicate that enough agent server processes 152 had not completed the commit phase for the leader agent server process 152 to determine that the data related to the prior transaction is valid. Otherwise, if the agent server process 152 cannot heal the object, roll the object forward, or roll the object back, then the agent server process 152 determines that the transaction recovery has failed and the staging sub-directories may be deleted.

Thus, the resource-constrained system 140 may be made accessible to user devices 102 during a recovery process after a service interruption is resolved. For example, the resource-constrained system 140 may be made accessible to the user devices 102 while prior incomplete transactions are still being recovered and/or executed (e.g., by an object agent 150). One or more object agents 150 may start recovering and/or executing prior incomplete transactions after the service interruption is resolved and while user devices 102 are accessing the resource-constrained system 140. For example, the object agent(s) 150 can recover and/or execute the prior incomplete transactions in sequence, in parallel, or overlapping in time in any order (e.g., alphabetically by object name, chronologically based on a time an object was created, chronologically based on a time an object was modified, chronologically based on a time that the prior incomplete transaction was submitted, etc.). In some embodiments, the object agent(s) 150 may perform the recovery and/or execution as part of a background process in which objects are scanned in a determined order, as described herein. If a user device 102 happens to submit a transaction associated with a first object that has a prior incomplete transaction yet to be recovered and/or executed, an object agent 150 can prioritize recovery and/or execution of the first object's prior incomplete transaction so that the submitted transaction can be completed thereafter. In other words, recovery and/or execution of other prior incomplete transactions may be paused, and an object agent 150 may instead recover and/or execute the first object's prior incomplete transaction. Once the prior incomplete transaction for the first object is recovered and/or executed and/or after the first object's currently submitted transaction is completed, then the object agent(s) 150 may resume recovering and/or executing the other prior incomplete transactions associated with other objects in the previously determined order.

Even though at least some prior incomplete transactions may have yet to be processed by the time a user device 102 starts interacting with the resource-constrained system 140, read-after-write consistency can still be achieved for an object that is a subject of a transaction submitted by the user device 102 given that the file systems implemented by the computing systems of the resource-constrained system 140 may treat each file, directory, and/or the like as a separate, independent object. For example, a transaction directed to one file may not affect the file's directory, other files in the directory, a parent directory, and/or the like. As a result, recovering and/or executing a prior incomplete transaction for a first object is sufficient for achieving read-after-write consistency for that first object (e.g., no other prior incomplete transactions need to be processed (e.g., recovered and/or executed) for read-after-write consistency to be achieved for the first object). Thus, even though all of the prior incomplete transactions may not yet have been recovered and/or executed, read-after-write consistency can be achieved for an object that is a subject of a transaction submitted by a user device 102 because either a prior incomplete transaction has already been recovered for the object (and no other prior incomplete transactions associated with other objects have to be completed) or because the prior incomplete transaction for that object can be prioritized and completed before completing the newly received transaction (and no other prior incomplete transactions associated with other objects have to be completed). Accordingly, the resource-constrained system 140 can reduce the number of I/O operations that are performed while ensuring that both processed objects (e.g., objects that have prior incomplete transactions that are completed) and unprocessed objects (e.g., objects that have prior incomplete transactions that are yet to be completed) remain accessible and consistent.

The in-region data center 120 and the resource-constrained system 140 are depicted in FIG. 1 as operating in a distributed computing environment including several computer systems that are interconnected using one or more computer networks (not shown in FIG. 1). The in-region data center 120 and the resource-constrained system 140 could also operate within a computing environment having a fewer or greater number of devices than are illustrated in FIG. 1. Thus, the depiction of the in-region data center 120 and the resource-constrained system 140 in FIG. 1 should be taken as illustrative and not limiting to the present disclosure. For example, the in-region data center 120 and/or the resource-constrained system 140 or various constituents thereof could implement various Web services components, hosted or "cloud" computing environments, or peer to peer network configurations to implement at least a portion of the processes described herein. In some instances, the in-region data center 120 and the resource-constrained system 140 may be combined into a single service. Further, the in-region data center 120 and the resource-constrained system 140 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the in-region data center 120 and the resource-constrained system 140 are illustrated as connected to the network 110. In some embodiments, any of the components within the in-region data center 120 can communicate with other components of the resource-constrained system 140 via the network 110. In other embodiments, not all components of the in-region data center 120 are capable of communicating with other components of the resource-constrained system 140.

While some functionalities are generally described herein with reference to an individual component of the in-region data center 120 and the resource-constrained system 140, other components or a combination of components may additionally or alternatively implement such functionalities. For example, while the object agents 150 are depicted in FIG. 1 as including the agent server processes 152, functions of the agent server processes 152 may additionally or alternatively be implemented by the cluster manager 124, another component in the in-region data center 120, and/or another component in the resource-constrained system 140. Thus, the specific configuration of elements within FIG. 1 is intended to be illustrative.

Example Block Diagram for Performing a Background Process

Figure 2B:
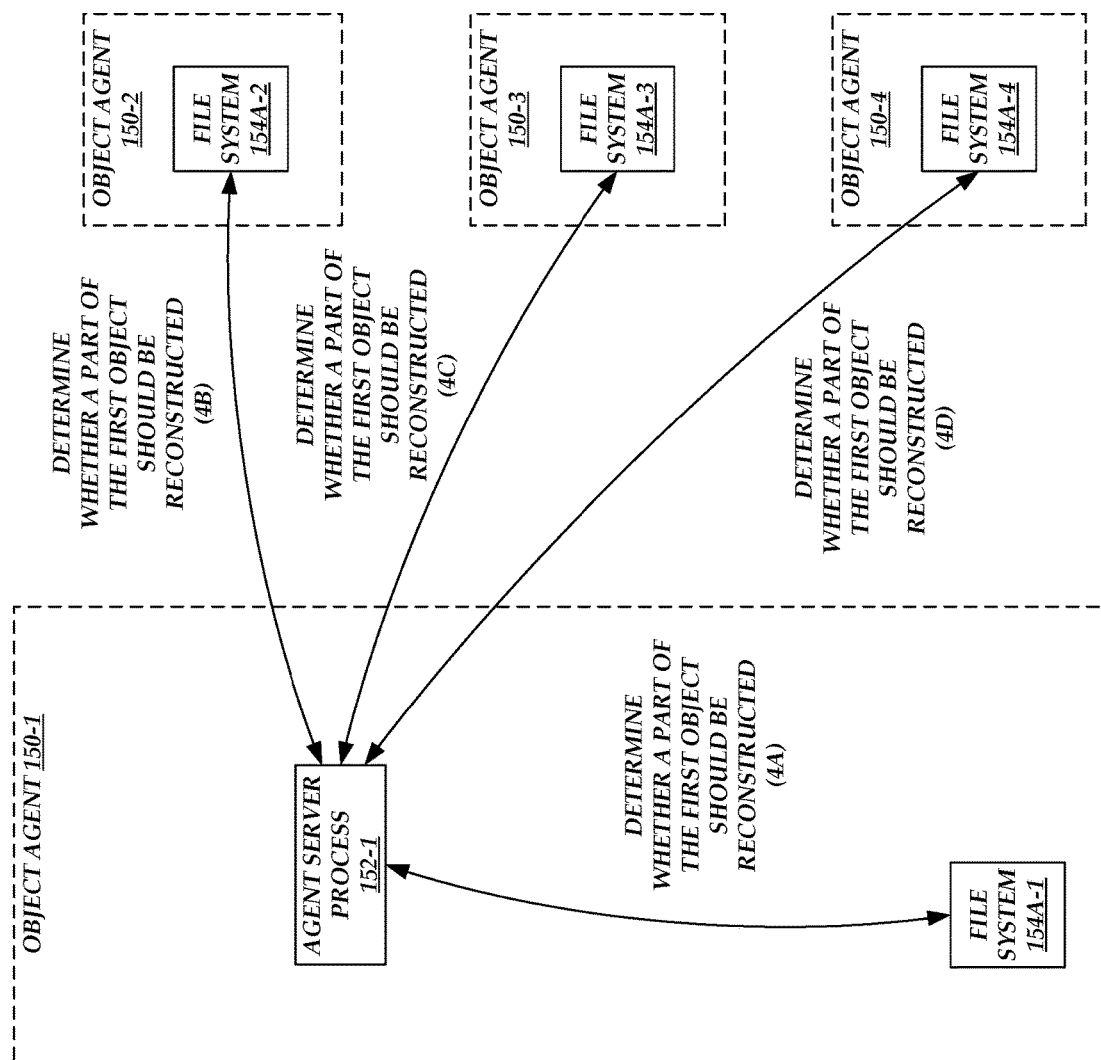
Figure 2C:
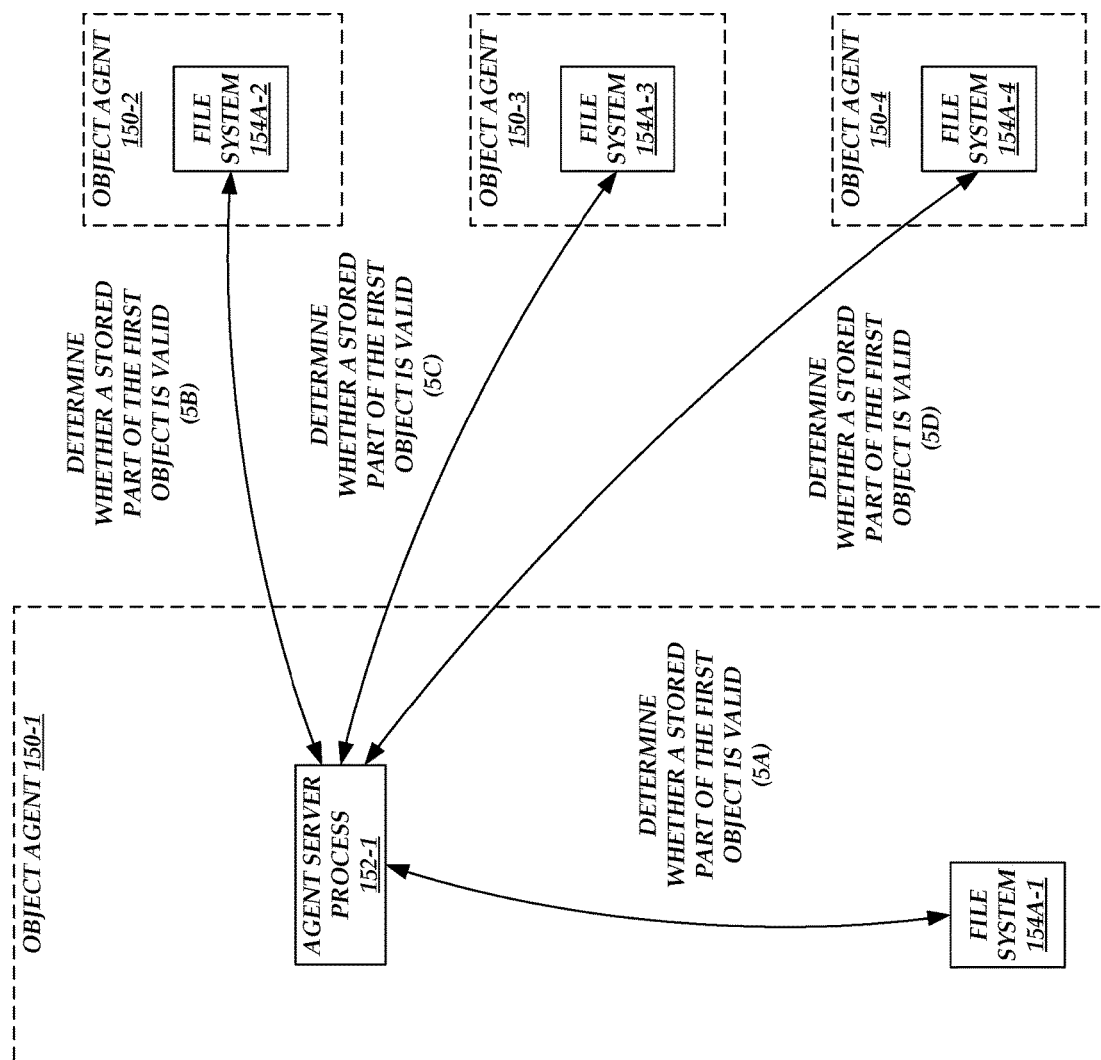

FIGS. 2A-2C are block diagrams of the operating environment 100 of FIG. 1 illustrating the operations performed by the components of the operating environment 100 to scan an object and perform one or more object storage service actions on the scanned object, according to one embodiment. As described herein, the operations illustrated in FIGS. 2A-2C may be performed as a background process and/or in response to a user device 102 submitting a transaction associated with an object.

As illustrated in FIG. 2A, agent server process 152-1 of object agent 150-1 may access a first object from file system 154A-1 at (1). For example, the agent server process 152-1 may have been selected as the leader agent server process 152-1, and the agent server process 152-1 may access the first object from a storage bucket or directory in the file system 154A-1. In particular, the agent server process 152-1 may access a data block or a parity block of the first object from the storage bucket or directory. The file system 154A-1, file system 154A-2 of object agent 150-2, file system 154A-3 of object agent 150-3, and file system 154A-4 of object agent 150-4 may be part of the same erasure coded set, and therefore the file systems 154A-2 through 154A-4 may also store a data block and/or a parity block of the first object. In addition, the object agents 150-1 through 150-4 may reside in the same subnet 142.

The agent server process 152-1 may then determine whether a transaction associated with the first object is to be recovered at (2A) by accessing the file system 154A-1. For example, the agent server process 152-1 may take a hash of the first object and determine whether a staging sub-directory exists in the file system 154A-1 that has a name matching the result of the hash. The agent server process 152-1 may determine that a transaction associated with the first object is to be recovered if the result of the hash matches a name of a staging sub-directory. If this determination is made, then the agent server process 152-1 may begin to recover and/or execute the transaction before proceeding to the remaining object storage service actions. Similarly, the agent server process 152-1 may determine whether a transaction associated with the first object is to be recovered at (2B) by accessing the file system 154A-2 and/or by requesting the agent server process 152-2 of the object agent 150-2 to access the file system 154A-2 and determine whether a staging sub-directory having a name matching the result of the hash exists, may determine whether a transaction associated with the first object is to be recovered at (2C) by accessing the file system 154A-3 and/or by requesting the agent server process 152-3 of the object agent 150-3 to access the file system 154A-3 and determine whether a staging sub-directory having a name matching the result of the hash exists, and may determine whether a transaction associated with the first object is to be recovered at (2D) by accessing the file system 154A-4 and/or by requesting the agent server process 152-4 of the object agent 150-4 to access the file system 154A-4 and determine whether a staging sub-directory having a name matching the result of the hash exists. If any of the file systems 154A-2 through 154A-4 has a staging sub-directory having a name that matches the result of the hash, the agent server process 152-1 may recover and/or execute the prior transaction and/or instruct the appropriate agent server process 152-2 through 152-4 to perform the same.

After the agent server process 152-1 determines that there is no prior transaction to recover and/or after the agent server process 152-1 has caused the prior transaction to be recovered and/or executed, the agent server process 152-1 can determine whether a lifecycle policy of the first object indicates that the first object should be deleted or a multipart upload associated with the first object should be aborted at (3). For example, the agent server process 152-1 may determine that the first object should be deleted if the first object was created more than a threshold time prior to a current time, and the agent server process 152-1 may determine that a multipart upload associated with the first object should be aborted if the multipart upload was initiated more than a second threshold time prior to the current time. If the agent server process 152-1 determines that the first object should be deleted or the multipart upload associated with the first object should be aborted, then the agent server process 152-1 may instruct the other agent server processes 152-2 through 152-4 to delete the first object and/or the agent server process 152-1 may skip the other operations described herein with respect to FIGS. 2B and 2C.

As illustrated in FIG. 2B, the agent server process 152-1 has determined that the lifecycle policy of the first object indicates that the first object should not be deleted and/or that a multipart upload associated with the first object should not be aborted. Thus, the agent server process 152-1 determines at (4A) whether a part of the first object should be reconstructed or healed by accessing the file system 154A-1. For example, the agent server process 152-1 can determine whether a data block or a parity block of the first object exists in the storage bucket or directory associated with the first object in the file system 154A-1. If the agent server process 152-1 determines that no data block or parity block of the first object exists in the file system 154A-1, then the agent server process 152-1 can heal or reconstruct the missing data block or parity block using at least two of the data blocks and/or parity blocks stored in the file systems 154A-2 through 154A-4. Similarly, the agent server process 152-1 may determine at (4B) whether a part of the first object should be reconstructed or healed to the file system 154A-2 by accessing the file system 154A-2 and/or by requesting the agent server process 152-2 to access the file system 154A-2 and determine whether the first object should be reconstructed or healed, may determine at (4C) whether a part of the first object should be reconstructed or healed to the file system 154A-3 by accessing the file system 154A-3 and/or by requesting the agent server process 152-3 to access the file system 154A-3 and determine whether the first object should be reconstructed or healed, and may determine at (4D) whether a part of the first object should be reconstructed or healed to the file system 154A-4 by accessing the file system 154A-4 and/or by requesting the agent server process 152-4 to access the file system 154A-4 and determine whether the first object should be reconstructed or healed. If any of the file systems 154A-2 through 154A-4 has a missing parity block or data block, the agent server process 152-1 may reconstruct or heal the missing parity block or data block and/or may instruct the corresponding agent server process 152-2 through 152-4 to perform the reconstruction.

As illustrated in FIG. 2C, the agent server process 152-1 may perform a bitrot check after the agent server process 152-1 determines that no reconstruction or healing is needed, the agent server process 152-1 reconstructs a part of the first object, and/or causes another agent server process 152 to reconstruct a part of the first object. For example, the agent server process 152-1 can determine at (5A) whether a stored part of the first object in the file system 154A-1 is valid by accessing the stored part of the first object from the file system 154A-1 and comparing the checksum(s) in the stored part to computed checksum(s). If any checksum in the stored part does not match a corresponding computing checksum, then the agent server process 152-1 may determine that bitrot has occurred. As a result, the agent server process 152-1 may reconstruct or heal the part and/or store the part in a different portion of the file system 154A-1 and/or object storage disk 156A-1. Similarly, the agent server process 152-1 may determine at (5B) whether a stored part of the first object in the file system 154A-2 is valid by accessing the stored part of the first object from the file system 154A-2 and comparing the checksum(s) in the stored part to computed checksum(s) and/or by requesting the agent server process 152-2 to access the file system 154A-2 and perform the checksum comparison, may determine at (5C) whether a stored part of the first object in the file system 154A-3 is valid by accessing the stored part of the first object from the file system 154A-3 and comparing the checksum(s) in the stored part to computed checksum(s) and/or by requesting the agent server process 152-3 to access the file system 154A-3 and perform the checksum comparison, and may determine at (5D) whether a stored part of the first object in the file system 154A-4 is valid by accessing the stored part of the first object from the file system 154A-4 and comparing the checksum(s) in the stored part to computed checksum(s) and/or by requesting the agent server process 152-4 to access the file system 154A-4 and perform the checksum comparison. If any of the file systems 154A-2 through 154A-4 has bitrot, the agent server process 152-1 may reconstruct or heal the missing parity block or data block and/or may instruct the corresponding agent server process 152-2 through 152-4 to perform the reconstruction.

After performing the bitrot check, the agent server process 152-1 may iterate to and scan the next object stored in the subnet 142 and repeat some or all of the operations depicted herein with respect to FIGS. 2A-2C. As described above, the order of operations depicted herein with respect to FIGS. 2A-2C is not meant to be limiting. The agent server process 152-1 can perform any of the depicted operations in any order and/or omit or skip any of the depicted operations. For example, the agent server process 152-1 may check the lifecycle policy prior to determining whether any prior transactions should be recovered.

Example Block Diagram for Executing a Transaction

Figure 3A:
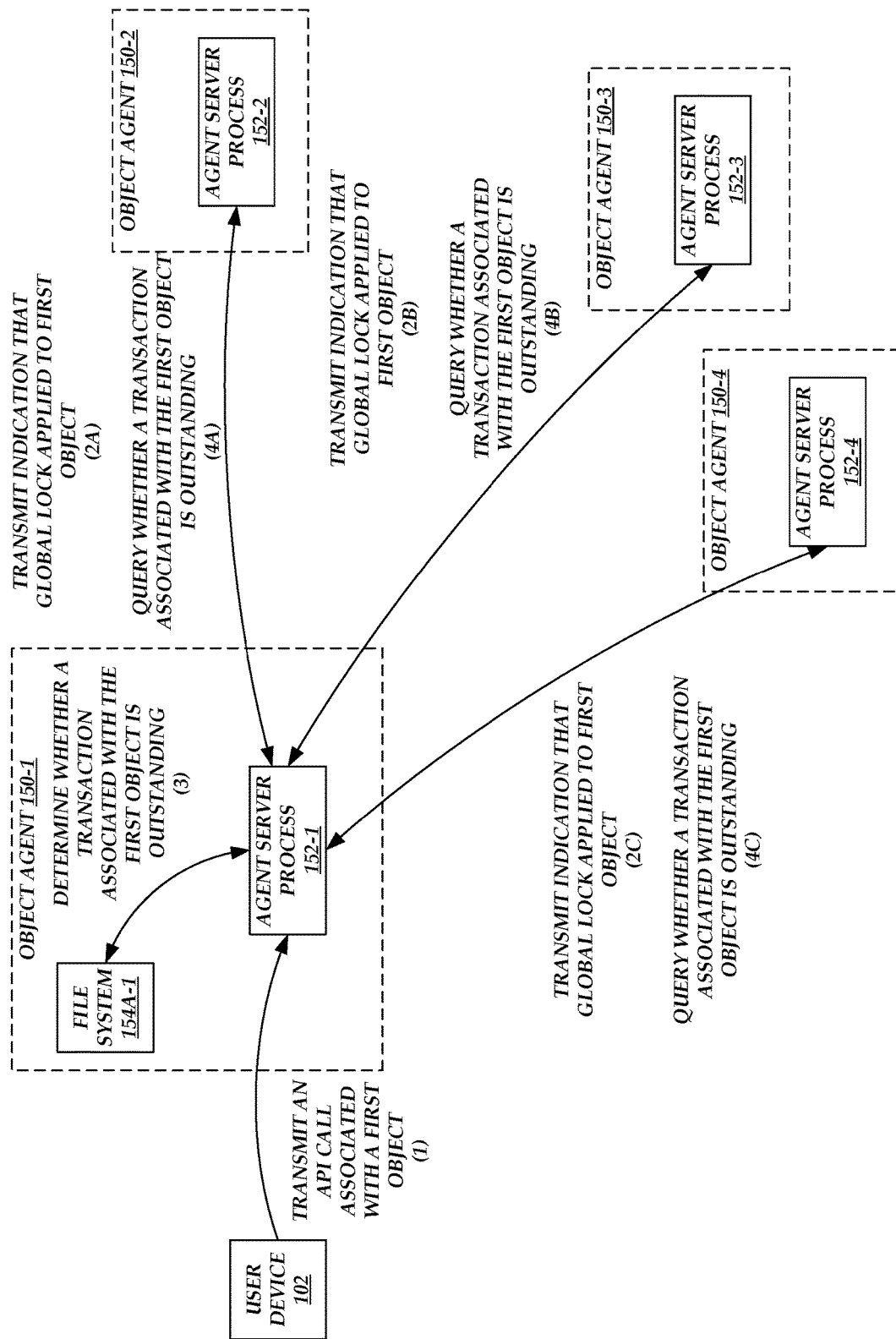
FIGS. 3A-3C are block diagrams of the operating environment of FIG. 1 illustrating the operations performed by the components of the operating environment to execute a transaction associated with a first object, according to one embodiment.
Figure 3B:
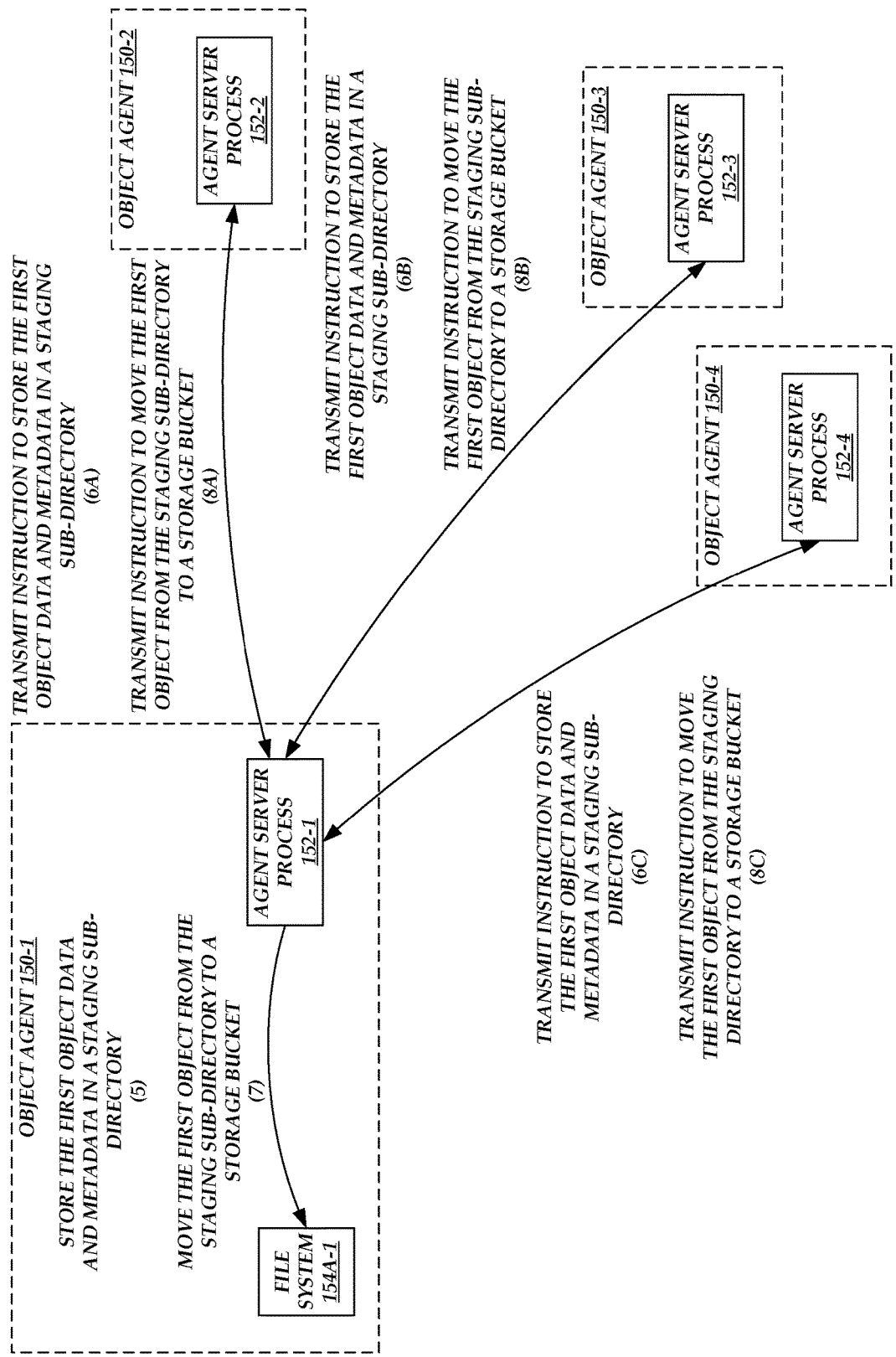
Figure 3C:
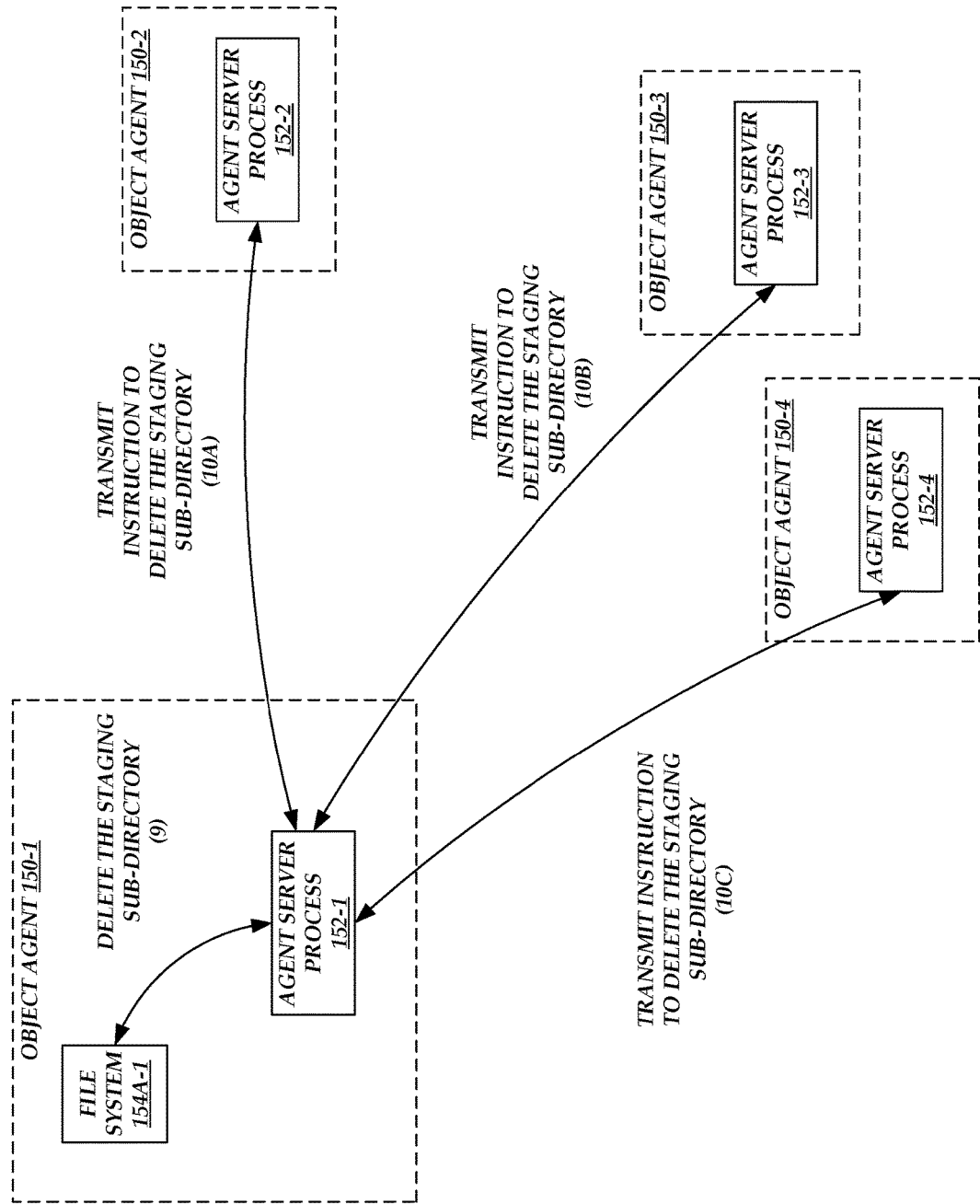

FIGS. 3A-3C are block diagrams of the operating environment 100 of FIG. 1 illustrating the operations performed by the components of the operating environment 100 to execute a transaction associated with a first object, according to one embodiment. As described herein, the operations illustrated in FIGS. 3A-3C may be performed in response to a user device 102 submitting a transaction associated with an object and/or the in-region data center 120 submitting a transaction associated with an object.

As illustrated in FIG. 3A, the user device 102 may transmit to the agent server process 152-1 an application programming interface (API) call associated with a first object at (1). For example, the API call may include a transaction to be executed that identifies the first object.

If the agent server process 152-1 is the agent server process 152 selected to be state change leader, the agent server process 152-1 can apply a global lock to the first object if no other lock on the first object is currently active. The agent server process 152-1 can then transmit to the agent server process 152-2 an indication that the global lock is applied to the first object at (2A), can transmit to the agent server process 152-3 an indication that the global lock is applied to the first object at (2B), and can transmit to the agent server process 152-4 an indication that the global lock is applied to the first object at (2C). Otherwise, the agent server process 152-1 can request a global lock for the first object from the agent server process 152 state change leader, and the agent server process 152 state change leader can inform the other agent server processes 152-2 through 152-4 that the global lock has been granted if that is indeed the case.

After the global lock is applied, the agent server process 152-1 can determine whether a transaction associated with the first object is outstanding at (3) (e.g., whether a prior, incomplete transaction associated with the first object is present) by accessing the file system 154-1. For example, the agent server process 152-1 can determine whether a staging sub-directory exists in the file system 154 that has a name matching a hash of the first object. If the staging sub-directory exists, then a prior transaction is present and the agent server process 152-1 can attempt to recover and/or execute the prior transaction. Similarly, the agent server process 152-1 can query the agent server process 152-2 whether a transaction associated with the first object is outstanding at (4A) (e.g., whether a staging sub-directory associated with the first object is present in the file system 154A-2) and/or directly access the file system 154A-2 to determine whether the staging sub-directory exists, query the agent server process 152-3 whether a transaction associated with the first object is outstanding at (4B) (e.g., whether a staging sub-directory associated with the first object is present in the file system 154A-3) and/or directly access the file system 154A-3 to determine whether the staging sub-directory exists, and query the agent server process 152-4 whether a transaction associated with the first object is outstanding at (4C) (e.g., whether a staging sub-directory associated with the first object is present in the file system 154A-4) and/or directly access the file system 154A-4 to determine whether the staging sub-directory exists. If the staging sub-directory exists, the agent server process 152-1 may recover and/or execute the prior transaction and/or instruct the corresponding agent server process 152 to do the same.

As illustrated in FIG. 3B, the agent server process 152-1 can store the first object data (e.g., data related to the transaction in the API call, such as the content of the first object) and/or metadata associated with the first object in a staging sub-directory at (5). For example, the agent server process 152-1 may store this data in the staging sub-directory after any prior transaction is recovered and/or executed. Similarly, the agent server process 152-1 can transmit an instruction to the agent server process 152-2 to store the first object data and/or the metadata in a staging sub-directory in the file system 154A-2 at (6A) and/or directly store the first object data and/or the metadata in the staging sub-directory in the file system 154A-2, transmit an instruction to the agent server process 152-3 to store the first object data and/or the metadata in a staging sub-directory in the file system 154A-3 at (6B) and/or directly store the first object data and/or the metadata in the staging sub-directory in the file system 154A-3, and transmit an instruction to the agent server process 152-4 to store the first object data and/or the metadata in a staging sub-directory in the file system 154A-4 at (6C) and/or directly store the first object data and/or the metadata in the staging sub-directory in the file system 154A-4.

After the propose and commit phases are complete, the agent server process 152-1 can move the first object from the staging sub-directory to a storage bucket associated with the first object in the file system 154A-1 at (7). For example, the agent server process 152-1 can move the current state of the first object from the storage bucket in the file system 154A-1 to the staging sub-directory and can move the first object (e.g., the data related to the transaction identified in the API call) from the staging sub-directory to the storage bucket. Similarly, the agent server process 152-1 can transmit an instruction to the agent server process 152-2 to move the first object from the staging sub-directory in the file system 154A-2 to a storage bucket at (8A) and/or directly move the first object from the staging sub-directory in the file system 154A-2 to the storage bucket, transmit an instruction to the agent server process 152-3 to move the first object from the staging sub-directory in the file system 154A-3 to a storage bucket at (8B) and/or directly move the first object from the staging sub-directory in the file system 154A-3 to the storage bucket, and transmit an instruction to the agent server process 152-2 to move the first object from the staging sub-directory in the file system 154A-4 to a storage bucket at (8C) and/or directly move the first object from the staging sub-directory in the file system 154A-4 to the storage bucket.

As illustrated in FIG. 3C, the agent server process 152-1 can delete the staging sub-directory from the file system 154-1 at (9) after the complete phase is finished. Similarly, the agent server process 152-1 can transmit an instruction to the agent server process 152-2 to delete the staging sub-directory from the file system 154A-2 at (10A) and/or directly delete the staging sub-directory from the file system 154A-2, transmit an instruction to the agent server process 152-3 to delete the staging sub-directory from the file system 154A-3 at (10B) and/or directly delete the staging sub-directory from the file system 154A-3, and transmit an instruction to the agent server process 152-4 to delete the staging sub-directory from the file system 154A-4 at (10C) and/or directly delete the staging sub-directory from the file system 154A-4.

As described above, the order of operations depicted herein with respect to FIGS. 3A-3C is not meant to be limiting. The agent server process 152-1 can perform any of the depicted operations in any order and/or omit or skip any of the depicted operations.

Example Background Process Routine

Figure 4:
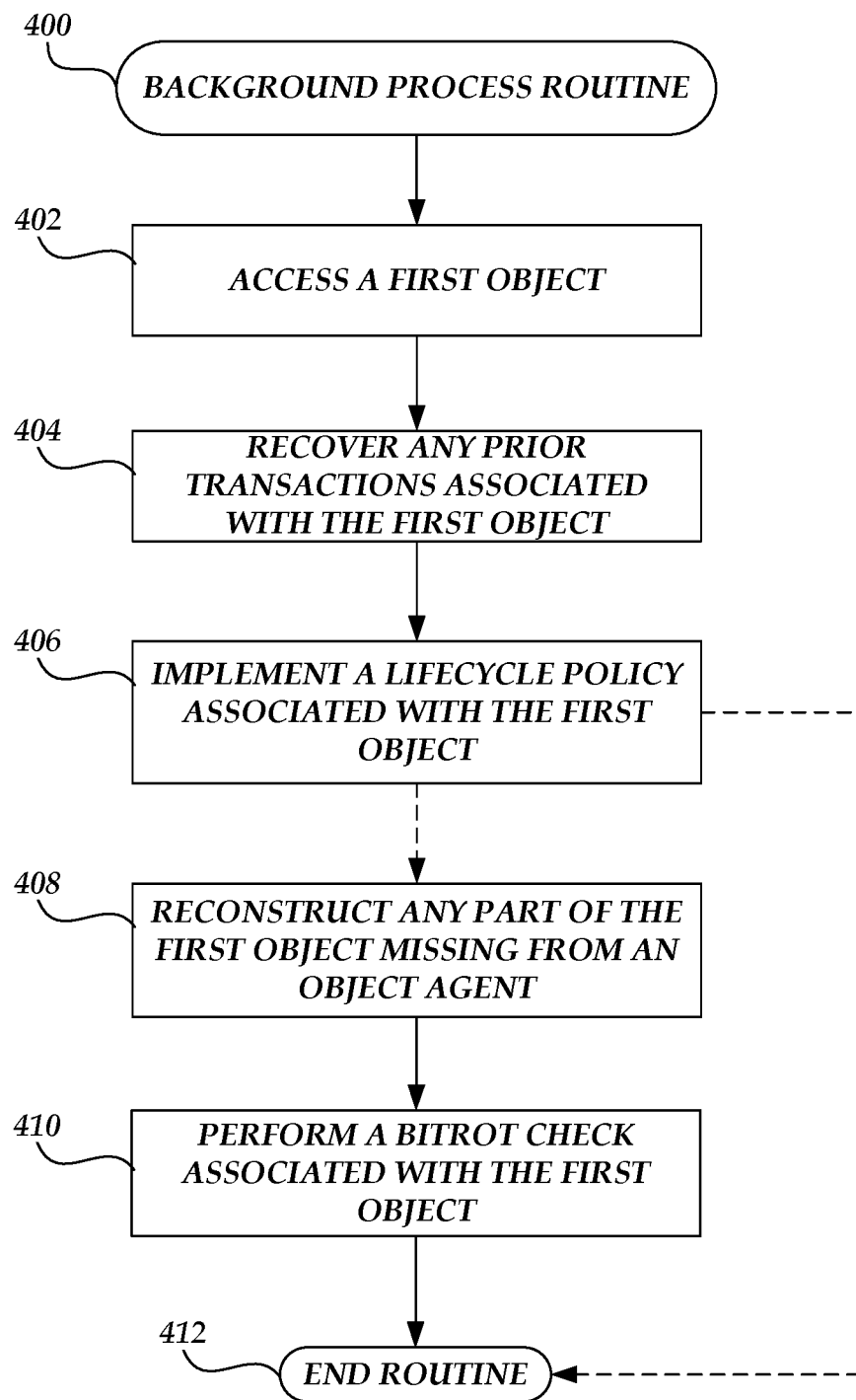
FIG. 4 is a flow chart depicting an illustrative routine for performing a background process on a set of objects stored on one or more object agents of FIG. 1.

FIG. 4 is a flow chart depicting an illustrative routine 400 for performing a background process on a set of objects stored on one or more object agents 150 of FIG. 1. The routine 400 is illustratively implemented by an object agent 150 of FIG. 1. For example, the routine 400 can be implemented by an agent server process 152.

At block 402, a first object is accessed. For example, the first object may be assigned to an erasure coded set and stored in a particular subnet. The first object may be accessed by an agent server process 152 in the subnet that is selected as a leader to perform scans of objects stored therein as part of a background process. Alternatively or in addition, the first object may be accessed by an agent server process 152 in response to the agent server process 152 receiving a transaction submitted by a user device 102 for execution.

At block 404, any prior transactions associated with the first object are recovered. For example, a prior transaction may be present if a service interruption caused one of the setup phase, the propose phase, the commit phase, the complete phase, and/or the cleanup phase from fully completing during execution of the prior transaction. As explained herein, the resource-constrained system 140 can provide user devices 102 with access to object storage services subsequent to a service interruption being resolved (e.g., after object storage services are restored) even if all prior incomplete transactions have yet to be recovered and/or executed given that the resource-constrained system 140 may treat each file, directory, and/or the like as a separate, independent object (and therefore a transaction directed to one file may not affect the file's directory, other files in the directory, a parent directory, etc.). Because the files, directories, etc. are treated as separate, independent objects, this may allow the resource-constrained system 140 to recover and/or execute prior transactions in the background and/or on-demand (e.g., in response to a transaction being received for a particular object), thereby reducing the delay in the resource-constrained system 140 restarting or resuming services that would otherwise be caused by the system trying first to recover some or all of the prior transactions. Thus, a prior incomplete transaction may be present even though a user device 102 may be able to access the resource-constrained system 140. As part of the recovery, the agent server process 152 can use artifacts in a staging sub-directory to identify the phase at which the prior transaction was in prior to the service interruption and restart the transaction from that phase. In some cases, the agent server process 152 can complete the prior transaction by healing the first object, by rolling the first object forward, or by rolling the first object back. In other cases, however, the agent server process 152 cannot complete the prior transaction and the prior transaction fails, thereby resulting in a deletion of the staging sub-directory.

At block 406, a lifecycle policy associated with the first object is implemented. For example, the lifecycle policy may indicate when the first object is to be deleted and/or when a multipart upload associated with the first object is to be aborted. If the lifecycle policy indicates that the first object is to be deleted and/or that a multipart upload associated with the first object is to be aborted, then the routine 400 can skip blocks 408 and 410 (e.g., conserve computing resources by refraining from possibly reconstructing an object part or performing a bitrot check), proceed to block 412, and end. Otherwise, if the lifecycle policy indicates that the first object should not be deleted and/or that a multipart upload associated with the first object should not be aborted, the routine 400 may continue to block 408.

At block 408, any part of the first object missing from an object agent is reconstructed or healed. For example, a part can be a data block or a parity block of the first object. The part may be missing from an object agent if the object agent crashed, had a hardware failure, was subject to a power failure, or experienced any other type of service interruption. In an embodiment, the missing part can be reconstructed if at least 50% of the parts of the first object are available (e.g., a read quorum of object agents having a part of the first object is present).

At block 410, a bitrot check associated with the first object is performed. For example, one or more checksums may be computed for each part of the first object and compared to checksum(s) included in the first object part. If any mismatch occurs, then the agent server process 152 may attempt to reconstruct or heal the first object part. After the bitrot check is performed, the routine 400 ends. The routine 400 then may be restarted for another object stored in the subnet 142. In other words, the agent server process 152 may scan another object stored in the subnet 142 and repeat blocks 402, 404, 406, 408, and/or 410 for that other object.

Thus, the routine 400 can execute a single I/O operation to disk (e.g., reading or accessing the first object) in relation to an object and perform one or more unrelated actions on the object.

While the routine 400 depicts operations being performed in a specific order, this is not meant to be limiting. The operations associated with blocks 402 through 410 can be performed in any order.

Example Transaction Execution Routine

Figure 5:
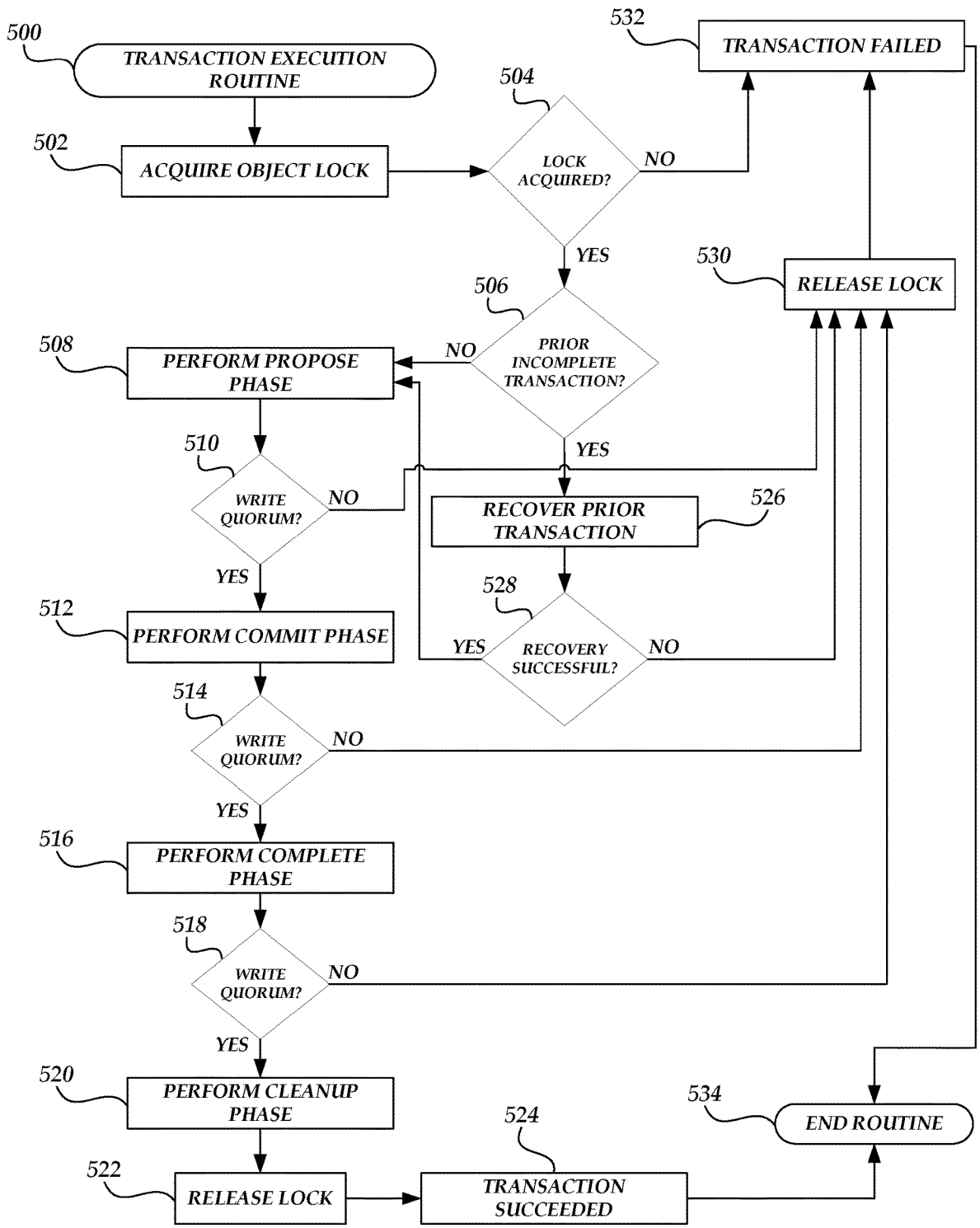
FIG. 5 is a flow chart depicting an illustrative routine for executing a transaction associated with a first object.

FIG. 5 is a flow chart depicting an illustrative routine 500 for executing a transaction associated with a first object. The routine 500 is illustratively implemented by an object agent 150 of FIG. 1. For example, the routine 500 can be implemented by an agent server process 152 in response to receiving an instruction to execute a transaction (e.g., from a user device 102, the in-region data center 120, the local VPC 146, etc.).

At block 502, an object lock on the first object is attempted to be acquired. For example, an agent server process 152 may request a global lock on the first object from the agent server process 152 state change leader. The global lock request may be granted if no other lock (local or global) on the first object is currently active. For example, if one agent server process 152 holds a local lock on the first object, then the agent server process 152 state change leader may not grant a global lock on the first object. Thus, if an agent server process 152 that was granted a global lock on the first object subsequently crashes (thereby rendering the global lock invalid) while another agent server process 152 holds a local lock (e.g., to perform the complete phase), the local lock may prevent another agent server process 152 from being granted a global lock and creating a conflict.

At block 504, a determination is made as to whether the object lock on the first object is acquired. For example, the agent server process 152 state change leader may inform the requesting agent server process 152 whether the object lock is granted. If the object lock is granted, the routine 500 proceeds to block 506. Otherwise, if the object lock is not granted, the routine 500 proceeds to block 532 and execution of the transaction fails.

At block 506, a determination is made as to whether a prior, incomplete transaction is present. For example, a prior, incomplete transaction may be present if a staging sub-directory exists in a file system 154 having a name that matches a hash of the first object. The staging sub-directory can exist in any file system 154 within the erasure coded set assigned to the first object. If a prior, incomplete transaction is present, the routine 500 proceeds to block 526 to attempt to recover and/or execute the prior transaction. Otherwise, if no prior, incomplete transaction is present, then the routine 500 proceeds to block 508.

At block 508, the propose phase is performed. For example, a staging sub-directory may be created in each file system 154 in the erasure coded set and data related to the transaction may be stored therein.

At block 510, a determination is made as to whether at least a write quorum of object agents 150 (e.g., agent server processes 152) have successfully created the staging sub-directory and stored the data related to the transaction therein. If at least a write quorum of object agents 150 have successfully created the staging sub-directory and stored the data related to the transaction therein, then the routine 500 proceeds to block 512. Otherwise, if at least a write quorum of object agents 150 have not successfully created the staging sub-directory and stored the data related to the transaction therein, then the routine 500 proceeds to block 530 and the object lock is released before execution of the transaction is failed.

At block 512, the commit phase is performed. For example, metadata related to the first object is stored in the staging sub-directories.

At block 514, a determination is made as to whether at least a write quorum of object agents 150 (e.g., agent server processes 152) have successfully stored the metadata in their respective staging sub-directory. In some embodiments, a determination is made as to whether the same write quorum of object agents 150 that created the staging sub-directory and stored the data related to the transaction therein also has successfully stored the metadata in the corresponding staging sub-directory. If at least a write quorum of object agents 150 have successfully stored the metadata in their respective staging sub-directories (and/or the write quorum is the same write quorum of object agents 150 that created the staging sub-directory and stored the data related to the transaction therein), then the routine 500 proceeds to block 516. Otherwise, if at least a write quorum of object agents 150 have not successfully stored the metadata in their respective staging sub-directories (and/or the write quorum is not the same write quorum of object agents 150 that created the staging sub-directory and stored the data related to the transaction therein), then the routine 500 proceeds to block 530 and the object lock is released before execution of the transaction is failed.

At block 516, the complete phase is performed. For example, the current state of the first object (if present) may be moved from the storage bucket or directory to a folder in the staging sub-directory and the data related to the transaction may be moved from the staging sub-directory to the storage bucket or directory. In other words, the data related to the transaction may replace the current state of the first object. As part of the complete phase, each agent server process 152 may obtain a local lock on the first object prior to performing the replacement operations. Each agent server process 152 may release the local lock after performing the replacement operations.

At block 518, a determination is made as to whether at least a write quorum of object agents 150 (e.g., agent server processes 152) have successfully replaced the current state of the first object with the data related to the transaction. In some embodiments, a determination is made as to whether the same write quorum of object agents 150 that created the staging sub-directory and stored the data related to the transaction therein also has successfully replaced the current state of the first object with the data related to the transaction. If at least a write quorum of object agents 150 have successfully replaced the current state of the first object with the data related to the transaction (and/or the write quorum is the same write quorum of object agents 150 that created the staging sub-directory and stored the data related to the transaction therein), then the routine 500 proceeds to block 520. Otherwise, if at least a write quorum of object agents 150 have not successfully replaced the current state of the first object with the data related to the transaction (and/or the write quorum is not the same write quorum of object agents 150 that created the staging sub-directory and stored the data related to the transaction therein), then the routine 500 proceeds to block 530 and the object lock is released before execution of the transaction is failed.

At block 520, the cleanup phase is performed. For example, the staging sub-directory may be deleted on each file system 154 in the erasure coded set assigned to the first object.

At block 522, the global lock on the first object is released. For example, the leader agent server process 152 may release the global lock itself and inform the other agent server processes 152 that the global lock is released, or the leader agent server process 152 may request that the agent server process 152 state change leader release the global lock and the agent server process 152 state change leader may release the global lock and inform the other agent server processes 152 that the global lock is released. Thus, other agent server processes 152 can request and be granted a global lock on the first object in the future.

At block 524, the transaction is considered to have succeeded. Thus, the routine 500 then proceeds to block 534 and the routine 500 ends.

At block 526, the prior transaction is recovered. For example, the leader agent server process 152 may attempt to restart the prior transaction from the phase at which the prior transaction was in before execution of the prior transaction was paused, such as due to a service interruption. Thus, the leader agent server process 152 may perform or cause one or more other agent server processes 152 to perform a portion of or all of some or all of the setup phase, the propose phase, the commit phase, the complete phase, and/or the cleanup phase. As part of the recovery, the first object may be healed, rolled back, or rolled forward. Additional details of the recovery operations are described below with respect to FIG. 6.

At block 528, a determination is made as to whether the recovery was successful. If the recovery was successful (e.g., the first object could be healed, rolled back, or rolled forward), then the routine 500 proceeds back to block 508. Otherwise, if the recovery was not successful (e.g., the first object could not be healed, rolled back, or rolled forward), then the routine 500 proceeds to block 530 and the object lock is released before execution of the transaction is failed.

At block 530, the global lock of the first object is released. For example, the leader agent server process 152 may release the global lock itself and inform the other agent server processes 152 that the global lock is released, or the leader agent server process 152 may request that the agent server process 152 state change leader release the global lock and the agent server process 152 state change leader may release the global lock and inform the other agent server processes 152 that the global lock is released.

At block 532, execution of the transaction has failed. Failing execution of the transaction may include deleting the staging sub-directories, if created. After execution of the transaction has failed, the routine 500 proceeds to block 534 and the routine 500 ends.

Example Transaction Recovery Routine

Figure 6:
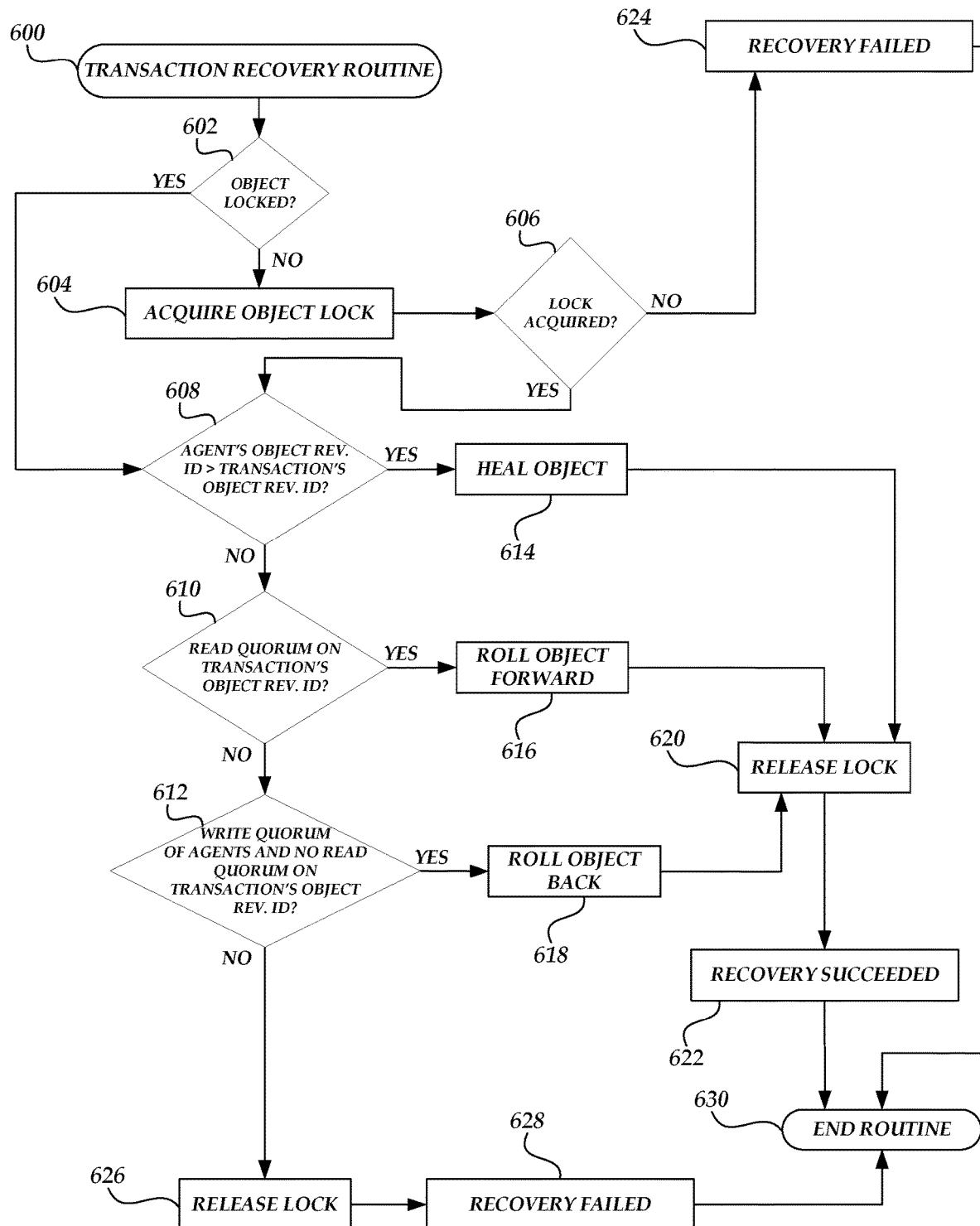
FIG. 6 is a flow chart depicting an illustrative routine for recovering a prior transaction associated with a first object.

FIG. 6 is a flow chart depicting an illustrative routine 600 for recovering a prior transaction associated with a first object. The routine 600 is illustratively implemented by an object agent 150 of FIG. 1. For example, the routine 600 can be implemented by an agent server process 152 in response to receiving an instruction to execute a new transaction (e.g., from a user device 102, the in-region data center 120, the local VPC 146, etc.) and/or in response to performing a background scan of objects.

At block 602, a determination is made as to whether the first object is locked. For example, a determination may be made to determine whether a global lock on the first object is still valid. The global lock may already be granted if the prior transaction entered at least the setup phase. The global lock may not already be granted if the prior transaction is detected as a result of performing a background scan on the first object. If the first object is locked, then the routine 600 proceeds to block 608. Otherwise, if the first object is not locked, then the routine 600 proceeds to block 604.

At block 604, an object lock on the first object is attempted to be acquired. For example, an agent server process 152 may request a global lock on the first object from the agent server process 152 state change leader. The global lock request may be granted if no other lock (local or global) on the first object is currently active. For example, if one agent server process 152 holds a local lock on the first object, then the agent server process 152 state change leader may not grant a global lock on the first object. Thus, if an agent server process 152 that was granted a global lock on the first object subsequently crashes (thereby rendering the global lock invalid) while another agent server process 152 holds a local lock (e.g., to perform the complete phase), the local lock may prevent another agent server process 152 from being granted a global lock and creating a conflict.

At block 606, a determination is made as to whether the object lock on the first object is acquired. For example, the agent server process 152 state change leader may inform the requesting agent server process 152 whether the object lock is granted. If the object lock is granted, the routine 600 proceeds to block 608. Otherwise, if the object lock is not granted, the routine 600 proceeds to block 624 and recovery of the prior transaction fails.

At block 608, a determination is made as to whether any of the object revision identifiers of the current state of the first object stored in the object agents 150 is greater than an object revision identifier of the prior transaction. For example, the object revision identifier of the prior transaction may be identified in the name of the data related to the prior transaction stored in the staging sub-directory. If an object revision identifier of a current state of the first object is greater than an object revision identifier of the prior transaction, this may indicate that other transactions were executed after execution of the prior transaction was attempted. As a result, the leader agent server process 152 may determine not to execute the prior transaction. Rather, the routine 600 may proceed to block 614 to heal the first object such that the file systems 154 in the erasure coded set assigned to the first object each have a parity block or data block of the first object corresponding to the current state of the first object. In other words, the leader agent server process 152 may ensure that each object agent 150 has a most-recent version of the first object rather than an old version of the first object or a version based on partial execution of the prior transaction. If an object revision identifier of a current state of the first object is not greater than an object revision identifier of the prior transaction, then the routine 600 may proceed to block 610 to attempt to roll back or roll forward the first object.

At block 610, a determination is made as to whether at least a read quorum of data blocks and/or parity blocks exist in the file systems 154 that are part of the erasure coded set assigned to the first object that have an object revision identifier that matches the object revision identifier of the prior transaction. In other words, a determination is made as to whether at least a read quorum of object agents 150 (e.g., at least a read quorum of agent server processes 152) were able to execute the prior transaction and store a data block or parity block of the first object generated based on execution of the prior transaction in the storage bucket or directory. If at least a read quorum of data blocks and/or parity blocks that have an object revision identifier that matches the object revision identifier of the prior transaction exist in the corresponding file systems 154, then enough data is present to generate and store a parity block and/or a data block of the first object that has the same object revision identifier as the object revision identifier of the prior transaction (e.g., generate a parity block or data block based on the data related to the prior transaction) in the storage buckets or directories that currently do not have such a parity block or data block. Thus, the routine 600 proceeds to block 616 and the first object is rolled forward. Otherwise, if at least a read quorum of data blocks and/or parity blocks that have an object revision identifier that matches the object revision identifier of the prior transaction do not exist, then the routine 600 proceeds to block 612 to attempt to roll back the first object.

At block 612, a determination is made as to whether at least a write quorum of object agents 150 in the subnet 142 are present and no read quorum of data blocks and/or parity blocks that have an object revision identifier that matches the object revision identifier of the prior transaction exists. If it is determined that at least the write quorum is present and the read quorum is not present, then this may indicate that while the first object cannot be updated to a version based on the data related to the transaction, the first object can at least be rolled back to the current state of the first object. Thus, the routine 600 then proceeds to block 618 and the first object is rolled back. Otherwise, if the write quorum is not present or the read quorum is present, then the prior transaction cannot be recovered. Thus, the routine 600 proceeds to block 626 to release the global lock.

At block 614, the first object is healed. For example, the first object can be healed by creating a new parity block or a new data block (whichever is missing) from the existing parity blocks and/or data blocks having the object revision identifier of the prior transaction that are stored in the erasure coded set. The routine 600 then proceeds to block 620.

At block 616, the first object is rolled forward. For example, the first object can be rolled forward by creating a new parity block or a new data block (whichever is missing) from the existing parity blocks and/or data blocks having the object revision identifier of the prior transaction that are stored in the erasure coded set. Alternatively, the first object can be rolled forward by performing some or all of the remaining phases that were previously left uncompleted. The routine 600 then proceeds to block 620.

At block 618, the first object is rolled back. For example, the first object can be rolled back by replacing any parity block or data block having the object revision identifier of the prior transaction that is stored in a storage bucket with an old version of the parity block or data block that is stored in the staging sub-directory folder, such as the old version of the parity block or data block that is stored in the staging sub-directory folder (e.g., in the "old data" folder) during the complete phase. The routine 600 then proceeds to block 620.

At block 620, the global lock of the first object is released. For example, the leader agent server process 152 may release the global lock itself and inform the other agent server processes 152 that the global lock is released, or the leader agent server process 152 may request that the agent server process 152 state change leader release the global lock and the agent server process 152 state change leader may release the global lock and inform the other agent server processes 152 that the global lock is released.

At block 622, recovery of the prior transaction has succeeded. Thus, the agent server process(es) 152 may delete the staging sub-directories if the staging sub-directories have not already been deleted. The routine 600 then proceeds to block 630 and ends.

At block 624, recovery of the prior transaction has failed. Thus, the agent server process(es) 152 may delete the staging sub-directories if the staging sub-directories have not already been deleted. The routine 600 then proceeds to block 630 and ends.

At block 626, the global lock of the first object is released. For example, the leader agent server process 152 may release the global lock itself and inform the other agent server processes 152 that the global lock is released, or the leader agent server process 152 may request that the agent server process 152 state change leader release the global lock and the agent server process 152 state change leader may release the global lock and inform the other agent server processes 152 that the global lock is released.

At block 628, recovery of the prior transaction has failed. Thus, the agent server process(es) 152 may delete the staging sub-directories if the staging sub-directories have not already been deleted. The routine 600 then proceeds to block 630 and ends.

Terminology

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The term "or" should generally be understood to be inclusive, rather than exclusive. Accordingly, a set containing "a, b, or c" should be construed to encompass a set including a combination of a, b, and c.

Any routine descriptions, elements or blocks in the flow diagrams described herein or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims. P65782—Serverless processing of streaming data behind object storage interface

What is claimed is:

1. A system for performing one or more object storage service actions on a data object, the system comprising:
    an object data store configured to store a data object; and
    an agent server process implemented on a physical computing device, the agent server process configured with computer-executable instructions that, when executed, cause the agent server process to:
        access the data object;
        determine, based on accessing a file system associated with the object data store, that a prior transaction associated with the data object is present;
        recover the prior transaction in response to the determination that the prior transaction is present;
        determine that a lifecycle policy indicates that the data object should not be deleted;
        determine that a data block associated with the data object is not present in a second file system associated with a second object data store;
        reconstruct the data block in response to the determination that the data block associated with the data object is not present in the second file system;
        cause the second file system to store the reconstructed data block; and
        perform a bitrot check associated with the data object to determine whether bitrot caused by a storage medium that stores the data object is present.

2. The system of claim 1, wherein the agent server process is further configured with computer-executable instructions that, when executed, cause the agent server process to determine that a staging sub-directory associated with the data object is present in the file system.

3. The system of claim 1, wherein the agent server process is further configured with computer-executable instructions that, when executed, cause the agent server process to repeat some or all operations performed on the data object on a second data object after performance of the bitrot check associated with the data object.

4. The system of claim 1, wherein the agent server process is further configured with computer-executable instructions that, when executed, cause the agent server process to access the data object as part of a background scan of data objects or in response to reception of a transaction associated with the data object.

5. The system of claim 1, wherein the agent server process is further configured with computer-executable instructions that, when executed, cause the agent server process to determine that the lifecycle policy indicates that the data object should not be deleted and to perform the bitrot check in response to a single input/output (I/O) operation related to the data object being sent to the object data store.

6. A computer-implemented method comprising:
    accessing a data object via a file system associated with a first object data store in a plurality of object data stores;
    recovering a prior transaction associated with the data object that is present in the file system;
    implementing a lifecycle policy associated with the data object;
    reconstructing a block associated with the data object that is not present in the plurality of object data stores; and
    performing a bitrot check associated with the data object to determine whether bitrot caused by a storage medium that stores the data object is present.

7. The computer-implemented method of claim 6, wherein recovering a prior transaction associated with the data object further comprises:
    determining that a staging sub-directory associated with the data object is present in the file system; and
    one of healing the data object, rolling back the data object, or rolling forward the data object.

8. The computer-implemented method of claim 6, further comprising:
    accessing a second data object via the file system after performing the bitrot check associated with the data object;
    determining that the lifecycle policy indicates that the second data object should be deleted;
    deleting the second data object; and
    skipping performing a bitrot check associated with the second data object in response to the determination that the lifecycle policy indicates that the second data object should be deleted.

9. The computer-implemented method of claim 6, wherein accessing the data object further comprises accessing the data object as part of a background scan of data objects.

10. The computer-implemented method of claim 6, wherein accessing the data object further comprises accessing the data object in response to reception of a transaction associated with the data object.

11. The computer-implemented method of claim 10, further comprising executing the transaction associated with the data object after recovering the prior transaction associated with the data object.

12. The computer-implemented method of claim 6, wherein implementing the lifecycle policy and performing the bitrot check further comprises implementing the lifecycle policy and performing the bitrot check in response to a single input/output (I/O) operation related to the data object being sent to the first object data store.

13. The computer-implemented method of claim 6, wherein the file system and other file systems associated with other object data stores in the plurality of object data stores form at least part of an erasure coded set assigned to the data object.

14. Non-transitory computer-readable media comprising computer-executable instructions that, when executed by a computing system, cause the computing system to:
    access a data object via a file system associated with a first object data store in a plurality of object data stores;
    execute a first object storage service action in association with the data object;
    execute a second object storage service action in association with the data object, wherein the second object storage service action is executed independent of execution of the first object storage service action and comprises a determination of whether bitrot caused by a storage medium that stores the data object is present; and at least in response to execution of the second object storage service action in association with the data object, access a second data object and execute the first object storage service action and the second object storage service action in association with the second data object.

15. The non-transitory computer-readable media of claim 14, wherein the first object storage service action, executed in association with the data object, comprises one of recovery of a prior transaction associated with the data object, implementation of a lifecycle policy associated with the data object, or reconstruction of a parity block or a data block associated with the data object.

16. The non-transitory computer-readable media of claim 14, wherein the first object storage service action comprises recovery of a prior transaction, and wherein the computer-executable instructions further cause the computing system to:

determine that a staging sub-directory associated with the data object is present in the file system; and one of heal the data object, roll back the data object, or roll forward the data object.

17. The non-transitory computer-readable media of claim 14, wherein the computer-executable instructions further cause the computing system to:

access a third data object via the file system after executing the second object storage service action in association with the second data object;

determine, as a result of execution of the first object storage service action in association with the third data object, that the third data object should be deleted;

delete the third data object; and skip execution of the second object storage service action in association with the third data object.

18. The non-transitory computer-readable media of claim 14, wherein the computer-executable instructions further cause the computing system to access the data object as part of a background scan of data objects.

19. The non-transitory computer-readable media of claim 14, wherein the computer-executable instructions further cause the computing system to access the data object in response to reception of a transaction associated with the data object.

20. The non-transitory computer-readable media of claim 14, wherein the computer-executable instructions further cause the computing system to execute the first and second object storage service actions in response to a single input/output (I/O) operation related to the data object being sent to the first object data store.

* * * * *